(12) United States Patent
Ahn et al.

(10) Patent No.: US 12,604,104 B2
(45) Date of Patent: Apr. 14, 2026

(54) IMAGE SENSOR AND IMAGE PROCESSING APPARATUS GENERATING A COLOR RATIO OF A SATURATION PIXEL GROUP

(71) Applicant: SAMSUNG ELECTRONICS CO., LTD., Suwon-si (KR)

(72) Inventors: Dochang Ahn, Suwon-si (KR); Seongwook Song, Suwon-si (KR); Jeongguk Lee, Suwon-si (KR); Taeshick Wang, Suwon-si (KR); Jaeseong Yu, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 33 days.

(21) Appl. No.: 18/818,006

(22) Filed: Aug. 28, 2024

(65) Prior Publication Data

US 2025/0133300 A1    Apr. 24, 2025

(30) Foreign Application Priority Data

Oct. 24, 2023    (KR) .......................... 10-2023-014112

(51) Int. Cl.
  H04N 5/335    (2011.01)
  H04N 23/84    (2023.01)
(52) U.S. Cl.
  CPC ................................ H04N 23/843 (2023.01)
(58) Field of Classification Search
  CPC .................................................... H04N 23/86
  See application file for complete search history.

(56) References Cited

U.S. PATENT DOCUMENTS

| | | | |
|---|---|---|---|
| 8,861,851 B2 | 10/2014 | Heidrich et al. | |
| 9,014,504 B2 | 4/2015 | Lim et al. | |
| 9,294,688 B2 | 3/2016 | Ju et al. | |
| 9,912,839 B2 | 3/2018 | Kervec et al. | |
| 10,070,109 B2 | 9/2018 | Lim et al. | |
| 10,319,113 B2 | 6/2019 | Zhang et al. | |
| 11,074,677 B2 | 7/2021 | McElvain et al. | |
| 11,301,970 B2 | 4/2022 | Jung et al. | |
| 11,620,738 B2 | 4/2023 | Tajbakhsh et al. | |
| 2021/0152765 A1* | 5/2021 | Shim | H04N 25/589 |
| 2022/0217271 A1 | 7/2022 | Douady et al. | |
| 2025/0350868 A1* | 11/2025 | Lim | H04N 25/134 |

* cited by examiner

*Primary Examiner* — Gary C Vieaux
(74) *Attorney, Agent, or Firm* — Sughrue Mion, PLLC

(57)    ABSTRACT

An image sensor is provided. The image sensor includes: pixel groups; a readout circuit configured to output full pixel values respectively corresponding to the pixel groups and sub pixel values respectively corresponding to the pixel groups, wherein a full pixel value is generated based on pixel signals of all pixels in a first pixel group, and a sub pixel value is generated based on some of the pixel signals in the first pixel group; and an image signal processor configured to: generate, based on the full pixel value indicating the first pixel group is a saturation pixel group, a color ratio of the saturation pixel group by using a target sub pixel value corresponding to the saturation pixel group; and compensate for the full pixel value of the saturation pixel group based on the color ratio of the saturation pixel group.

20 Claims, 17 Drawing Sheets

FIDT

SIDT

IMAGE SENSOR AND IMAGE PROCESSING APPARATUS GENERATING A COLOR RATIO OF A SATURATION PIXEL GROUP

CROSS-REFERENCE TO RELATED APPLICATION

This application is based on and claims priority to Korean Patent Application No. 10-2023-0143112, filed on Oct. 24, 2023, in the Korean Intellectual Property office, the disclosure of which is incorporated by reference herein in its entirety.

BACKGROUND

The present disclosure relates to an image sensor, and more particularly, to an image sensor performing a high dynamic range (HDR) process of high reliability by compensating for full pixel values of a saturation pixel group by using sub-pixel values.

Image sensors are devices which capture two-dimensional or three-dimensional images of objects. The image sensors generate image data of the objects by using photoelectric conversion elements which react according to intensity of light reflected or emitted from the objects.

With the recent development of complementary metal-oxide semiconductor (COMS) technology, CMOS image sensors using the CMOS are widely used. When saturation pixel values are included in image data, the saturation pixel values may be expressed in a distorted manner and the quality of the image may deteriorate.

Accordingly, a technique for improving the quality of the image by compensating for the saturation pixel values by using more accurate pixel values is required.

SUMMARY

One or more example embodiments provide an image sensor for improving image quality by generating a color ratio of the saturation pixel group by using sub-pixel values, and compensating for full pixel values of a saturation pixel group with more accurate values based on the color ratio of the saturation pixel group, and an image processing apparatus.

According to an aspect of an example embodiment, an image sensor includes: a pixel array including a plurality of pixel groups each including a plurality of pixels, the plurality of pixel groups including a first pixel group; a readout circuit configured to output full pixel values respectively corresponding to the plurality of pixel groups and sub pixel values respectively corresponding to the plurality of pixel groups, wherein a full pixel value is generated based on pixel signals of all pixels in the first pixel group, and a sub pixel value is generated based on some of the pixel signals in the first pixel group; and an image signal processor configured to: perform an image processing operation based on the full pixel values; generate, based on the full pixel value indicating the first pixel group is a saturation pixel group, a color ratio of the saturation pixel group by using a target sub pixel value corresponding to the saturation pixel group; and compensate for the full pixel value of the saturation pixel group based on the color ratio of the saturation pixel group.

According to another aspect of an example embodiment, an image sensor including: a pixel array including a plurality of pixel groups each including a plurality of pixels, the plurality of pixel groups including a first pixel group; a readout circuit configured to generate image data based on pixel signals output by the pixel array; and an image signal processor. The image data includes full image data obtained by summing the pixel signals generated by all pixels of each of the plurality of pixel groups in units of pixel groups and sub image data obtained by summing the pixel signals generated by some of the pixels by each of the plurality of pixel groups in units of the pixel groups. The image signal processor is configured to: perform an image processing operation based on the image data; generate a color ratio of each of the plurality of pixel groups by using the sub image data; detect the first pixel group as a saturation pixel group based on the full image data; and compensate for the full image data corresponding to the saturation pixel group based on the color ratio corresponding to the saturation pixel group According to another aspect of an example embodiment, an image processing device including: an interface configured to receive, from an image sensor, full pixel values, the full pixel values being generated based on pixel signals of all pixels in each of a plurality of pixel groups of the image sensor, wherein each of the plurality of pixel groups respectively includes a plurality of pixels; and a processor configured to: detect a saturation pixel group among the plurality of pixel groups based on the full pixel values; generate a color ratio of the saturation pixel group based on a target sub pixel value generated based on the pixel signals of some pixels in the saturation pixel group; detect an unsaturated color component among a plurality of color components corresponding to the full pixel value of the saturation pixel group; and compensate for the full pixel value of the saturation pixel group by using the color ratio of the unsaturated color component.

BRIEF DESCRIPTION OF DRAWINGS

The above and other aspects and features will be more apparent from the following description of example embodiments, taken in conjunction with the accompanying drawings, in which.

3

Figure 12:
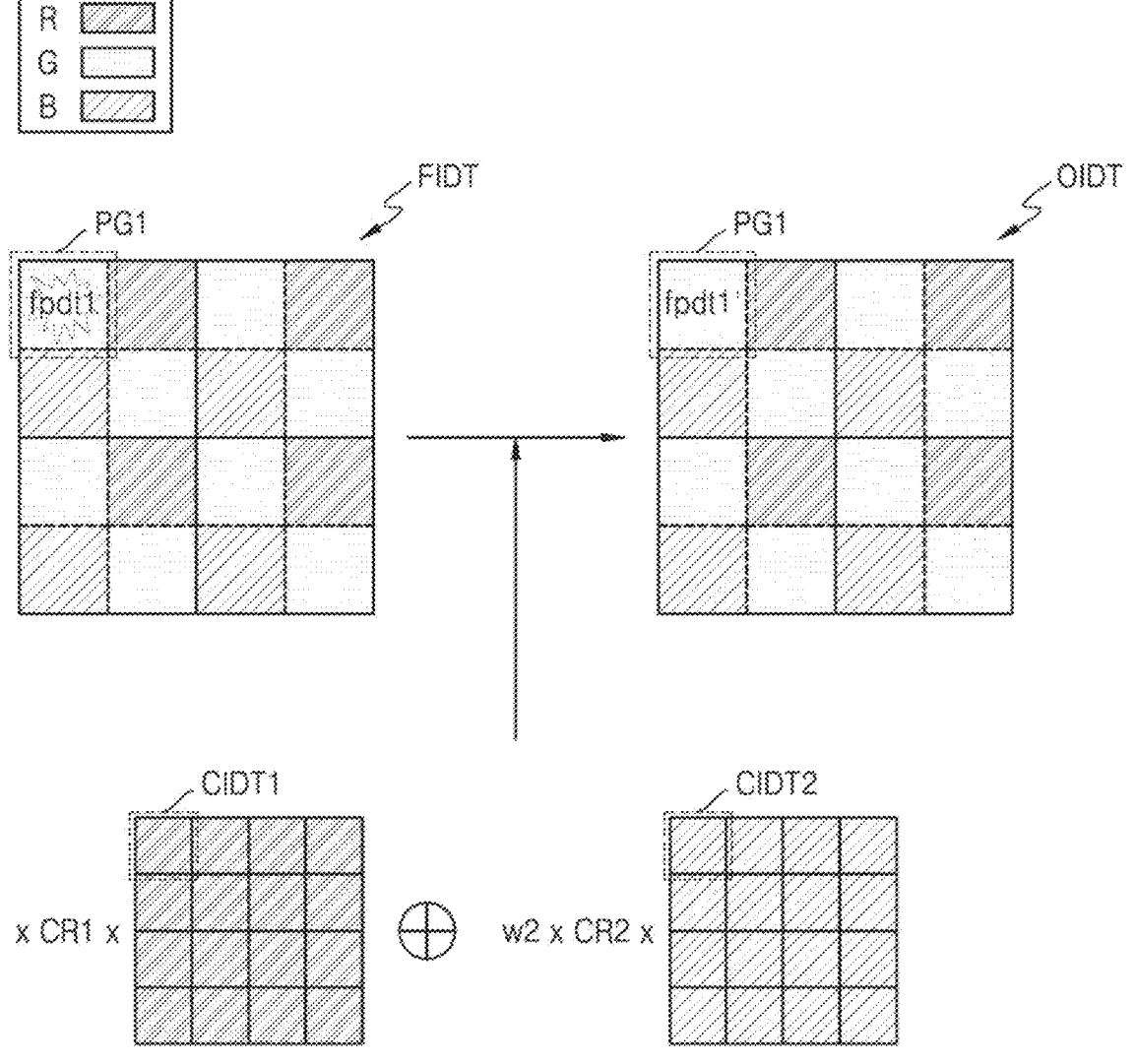
Figure 13:
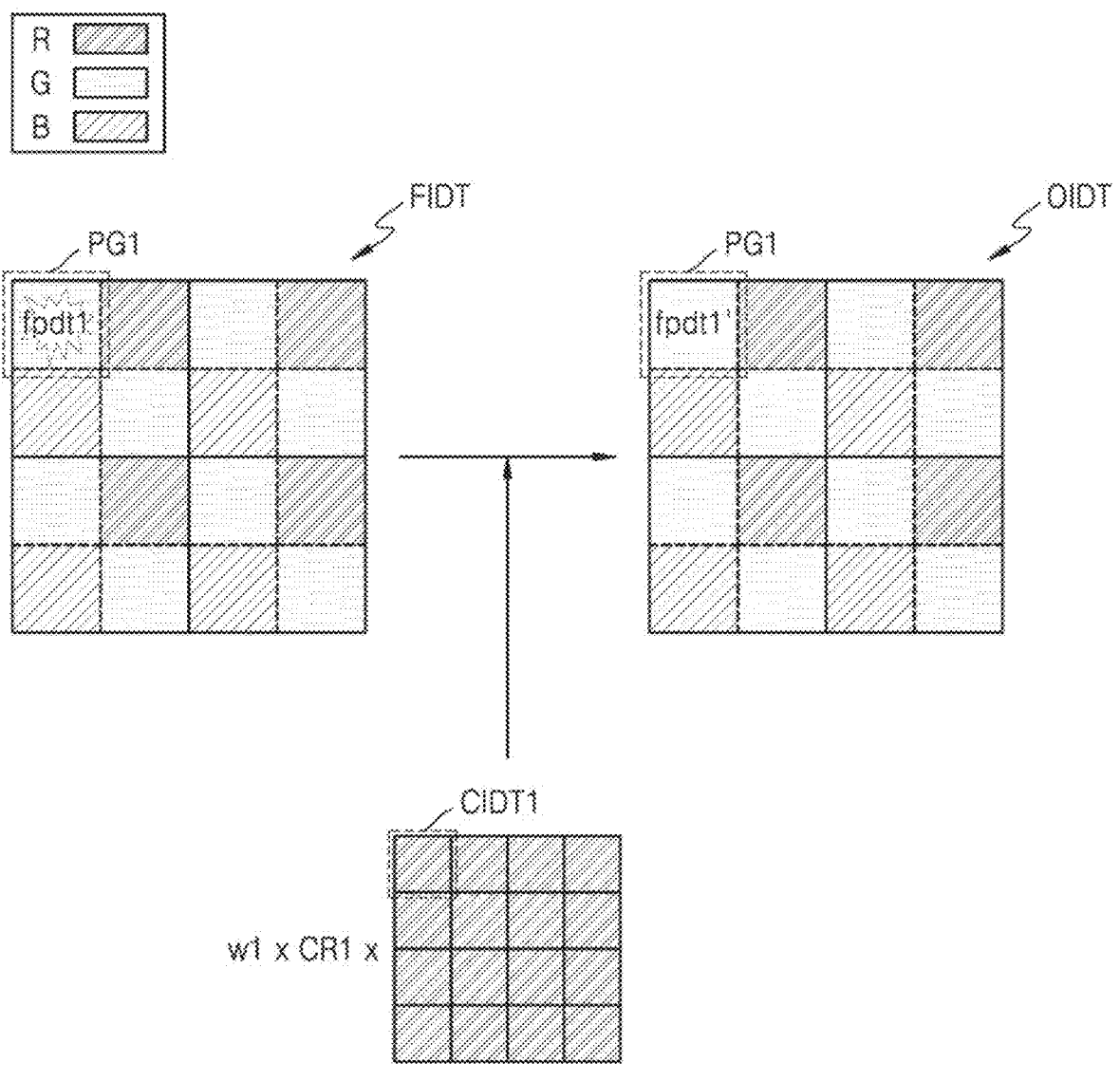
Figure 14:
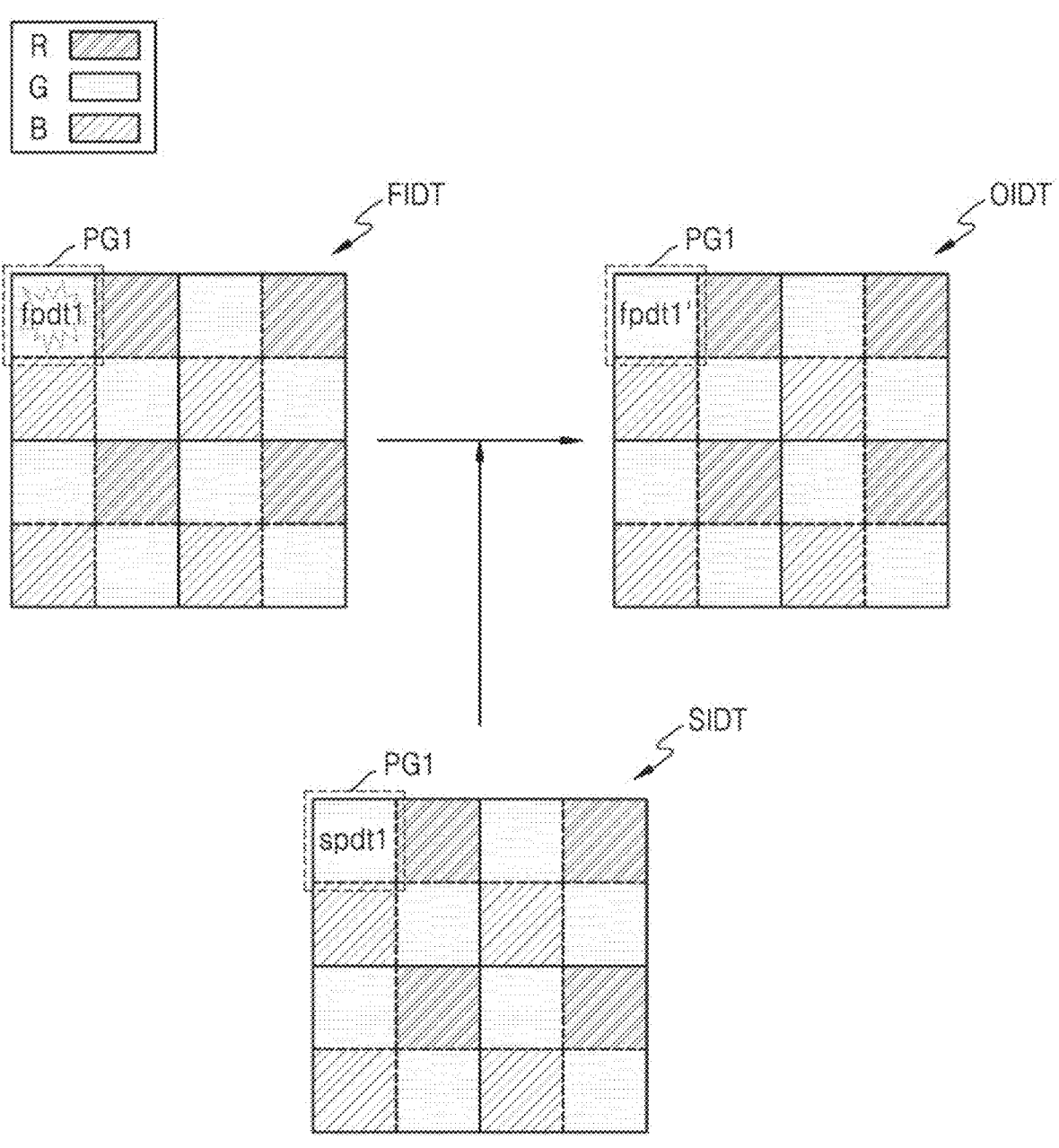
Figure 15:
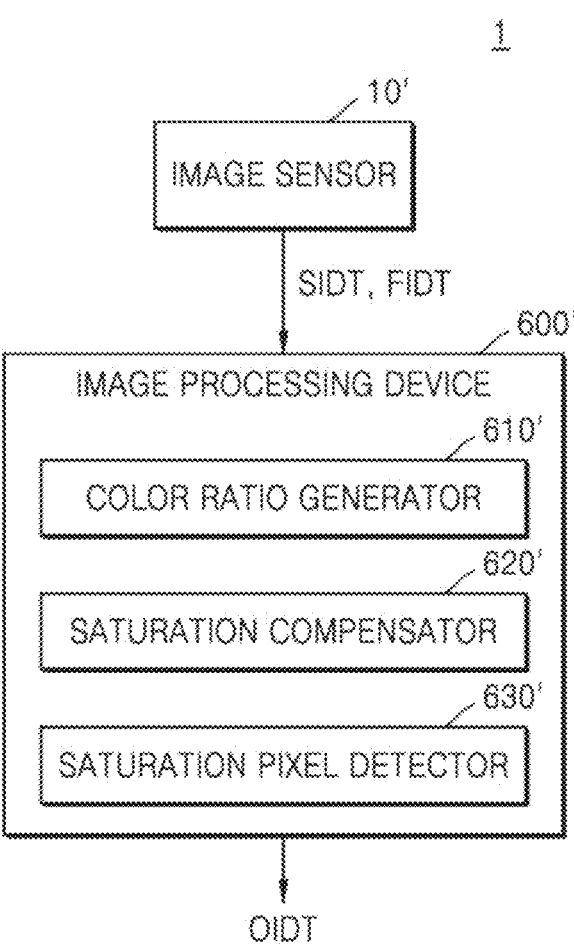
Figure 16:
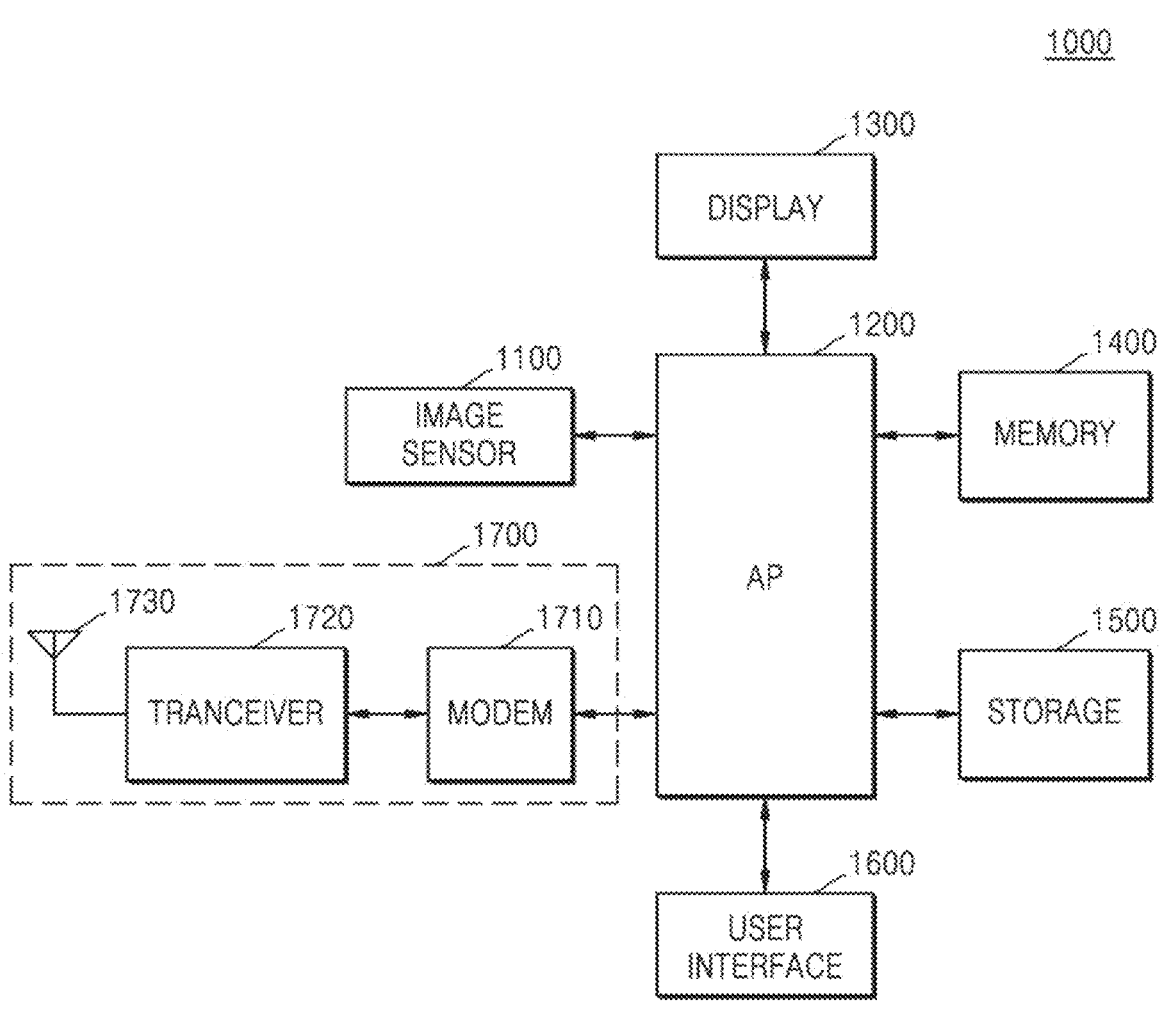

FIG. 12 is a diagram of a method of generating output image data by using color data, according to an example embodiment;

FIG. 13 is a diagram of a method of generating output image data by using color data of an unsaturated color, according to an example embodiment;

FIG. 14 is a diagram of a method of generating output image data by using sub-pixel values, according to an example embodiment;

FIG. 15 is a block diagram of an image system according to an example embodiment; and FIG. 16 is a block diagram of an electronic device according to an example embodiment.

DETAILED DESCRIPTION

Hereinafter, example embodiments will be described in detail with reference to the accompanying drawings. Identical reference numerals are used for the same constituent elements in the drawings, and duplicate descriptions thereof are omitted. Embodiments described herein are example embodiments, and thus, the present disclosure is not limited thereto, and may be realized in various other forms. Each example embodiment provided in the following description is not excluded from being associated with one or more features of another example or another example embodiment also provided herein or not provided herein but consistent with the present disclosure. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
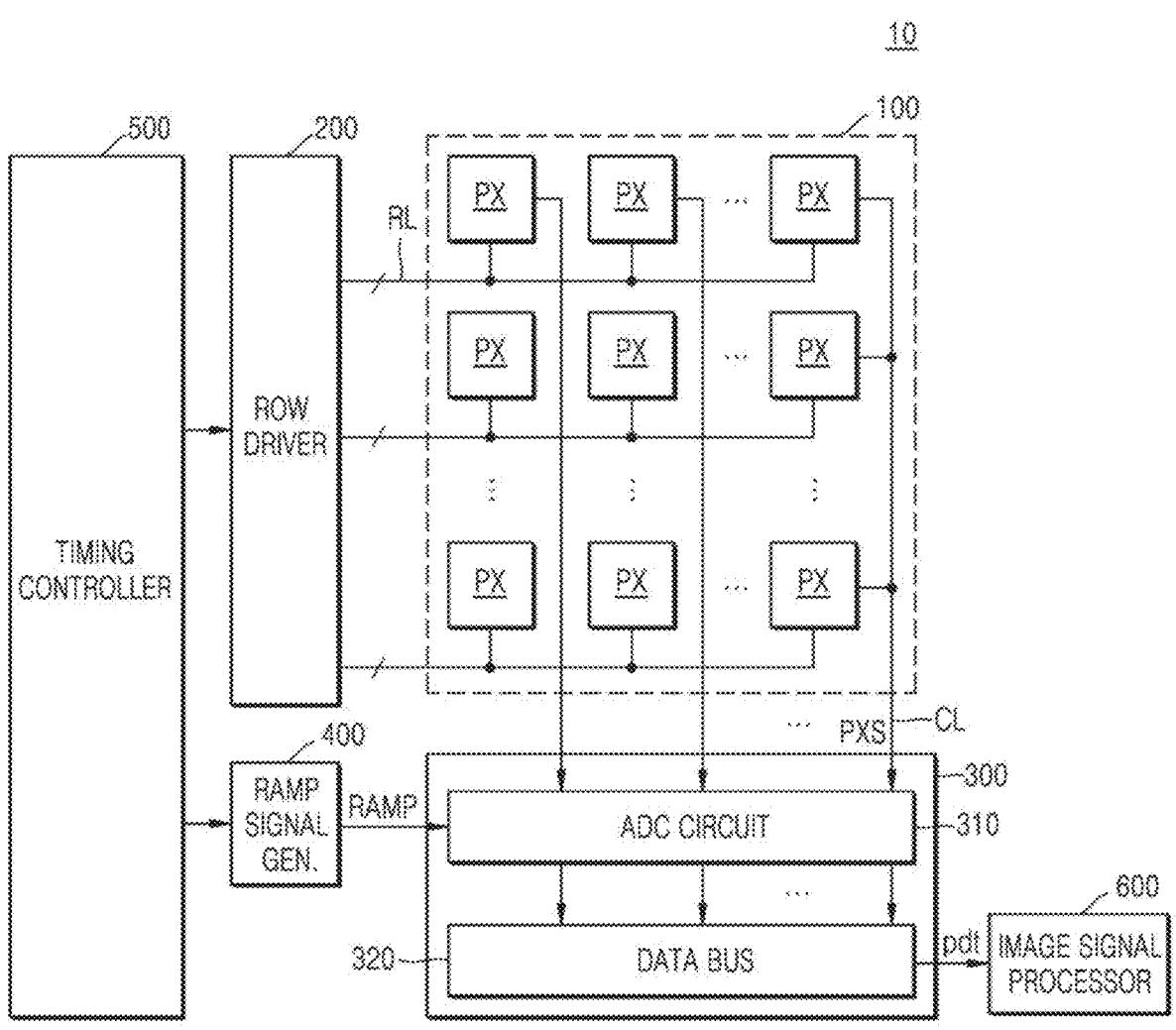
FIG. 1 is a block diagram of an image sensor according to an example embodiment.

FIG. 1 is a block diagram of an image sensor 10 according to an example embodiment.

The image sensor 10 may convert an optical signal of an object incident through an optical lens into image data. The image sensor 10 may include, for example, a charge coupled device (CCD) image sensor or a complementary metal oxide semiconductor (CMOS) image sensor.

The image sensor 10 may be mounted on an electronic device having an image or light sensing function. For example, the electronic device may be implemented as, for example, a personal computer (PC), an Internet of Things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, etc. In addition, the image sensor 10 may be mounted as a component in electronic equipment, such as a drone and an advanced drivers assistance system (ADAS), or a vehicle, furniture, manufacturing facilities, doors, various measurement equipment, etc.

Referring to FIG. 1, the image sensor 10 may include a pixel array 100, a row driver 200, a readout circuit 300, a ramp signal generator 400, a timing controller 500, and an image signal processor 600. The readout circuit 300 may include an analog-to-digital conversion (ADC) circuit 310 and a data bus 320. The pixel array 100, the row driver 200, the readout circuit 300, the ramp signal generator 400, the timing controller 500, and the image signal processor 600 may be implemented as a single semiconductor chip or a semiconductor module. The pixel array 100, the row driver 200, the readout circuit 300, the ramp signal generator 400, and the timing controller 500 may include circuits, may be implemented as a single semiconductor chip or a semiconductor module, and the image signal processor 600 may also be implemented as another semiconductor chip or another semiconductor module.

The pixel array 100 may be connected to a plurality of row lines RL and a plurality of column lines CL, and may include a plurality of pixels PX arranged in an array. In an example embodiment, the plurality of pixels PX may include active pixel sensors (APS). The pixel array 100 may include a plurality of pixels PX which sense light with different wavelengths. An array of the plurality of pixels PX may be implemented in various manners. For example, various pixel PX arrays of a pixel array 100 are described below with reference to FIGS. 3A and 3B.

The pixel array 100 may include pixel groups each including the plurality of pixels PX. For example, the pixel array 100 may include pixel groups in which four pixels PX arranged in two columns and two rows share one microlens. Alternatively, for example, the pixel array 100 may include pixel groups in which two pixels PX arranged adjacent to each other share one microlens. Each of the pixel groups may include a color filter corresponding thereto. A detailed configuration of the pixel array 100 are given below with reference to FIG. 2 and others.

Each of the plurality of pixels PX may include at least one photoelectric conversion element, and the pixel PX may detect light by using the photoelectric conversion element and output image signals which include electrical signals according to sensed light. For example, the photoelectric conversion element may include a photo-sensing element including an organic material or an inorganic material, such as an inorganic photodiode, an organic photodiode, a Perovskite photodiode, a phototransistor, a photogate, and a pinned photodiode. In an example embodiment, each of the plurality of pixels PX may include a plurality of photoelectric conversion elements.

The pixel signal PXS may include a sub pixel signal and a full pixel signal. The full pixel signal may mean a pixel signal generated based on pixel signals of all pixels PX included in each of the pixel groups included in the pixel array 100. As an example, the full pixel signal may include a signal obtained by summing pixel signals of all pixels PX included in each of the pixel groups. For example, the full pixel signal may include a signal obtained by summing the pixel signals of pixels PX included in the pixel group when the image sensor 10 performs a binning operation.

The sub pixel signal may mean a pixel signal generated based on a pixel signal of some pixels PX in each of the pixel groups. As an example, the sub pixel signal may include a signal obtained by summing pixel signals of some pixels PX included in each of the pixel groups.

The sub pixel signal may include a signal generated for the image sensor 10 to perform an autofocus function. For example, the pixel group may include a plurality of pixels PX, and some of the pixels PX included in the pixel group may include autofocus pixels which are used to perform an autofocus function. The sub pixel signal may include a signal obtained by summing the pixel signals of the autofocus pixels included in the pixel group. The sub pixel signal and the full pixel signal may both be output to the same column line CL, and the sub pixel signal may also be output via a separate line from the column line CL.

A color filter array for transmitting light in particular spectrum ranges may be arranged on the plurality of pixels PX, and a color, which a corresponding pixel detects according to a color filter arranged on each of the plurality of pixels PX, may be determined. However, example embodiments are not limited thereto, and in some example embodiments, in the case of a particular photoelectric conversion element, light in a particular wavelength band may also be converted into an electrical signal depending on the level of the electrical signal applied to the photoelectric conversion element.

In some example embodiments, the plurality of pixels PX may have a multi-layer structure. A pixel PX having a multi-layer structure may include a stacked plurality of photoelectric conversion elements, which convert light in different spectrum regions into electrical signals, and may generate electrical signals corresponding to different colors from the plurality of photoelectric conversion elements. In this regard, the electrical signals corresponding to a plurality of colors may be output by one pixel PX.

The row driver 200 may drive the pixel array 100 in units of rows. The row driver 200 may decode a row control signal (for example, an address signal) received from the timing controller 500, and in response to the decoded row control signal, may select at least one row line of the row lines constituting the pixel array 100. For example, the row driver 200 may generate a selection signal selecting one of the plurality of rows. In addition, the pixel array 100 may output the pixel signal PXS from the row selected by the selection signal provided by the row driver 200.

The row driver 200 may transmit the control signals for outputting the pixel signal PXS to the pixel array 100, and the pixel PX may output the pixel signal PXS by operating in response to the control signals. For example, the row driver 200 may generate control signals for controlling the pixel PX to output the pixel signal PXS during a readout period, and provide the generated control signals to the pixel array 100.

The readout circuit 300 may read out the pixel signal PXS from the pixels PX on a selected row by using the row driver 200, among the plurality of pixels PX. In this case, the pixel signal PXS may include a reset signal or an image signal (or a sensing signal). The readout circuit 300 may generate and output pixel values pdt corresponding to the plurality of pixels PX in row units, by converting the reset signals and the image signals, which are received from the pixel array 100 via the plurality of column lines CL, into digital signals based on a ramp signal RAMP from the ramp signal generator 400.

The pixel value pdt may include a full pixel value and a sub pixel value. The full pixel value may mean a pixel value in which the full pixel signal received from the pixel array 100 has been converted into a digital signal. Image data including the full pixel value of each pixel group may be referred to as full image data. The sub pixel value may mean a pixel value in which the sub pixel signal received from the pixel array 100 has been converted into a digital signal. The image data including the sub pixel value of each pixel group may be referred to as sub image data. The full pixel value and the sub pixel value of each pixel group may be output to the image signal processor 600. The full image data and the sub image data may be transferred to the image signal processor 600.

An ADC circuit 310 may include a plurality of ADCs respectively corresponding to the plurality of column lines CL, and each of the plurality of ADCs may compare the reset signal and the image signal received via the corresponding column line CL with the ramp signal RAMP, and may generate the pixel value pdt based on the comparison result. For example, the ADC may remove the reset signal from the image signal, and generate the pixel value pdt indicating the amount of light sensed by the pixel PX. A plurality of pixel values pdt generated by the ADC circuit 310 may be output via the data bus 320.

The ADC circuit 310 may include a plurality of correlated double sampling (CDS) circuits and a plurality of counter circuits. The ADC circuit 310 may convert the pixel signal PXS input from the pixel array 100 into the pixel value pdt, which is the digital signal. Each pixel signal PXS may be converted into the pixel value pdt, which is the digital signal, by the CDS circuit and the counter circuit.

The CDS circuit may compare the pixel signal PXS with the ramp signal, and output the comparison result. The CDS circuit may, when a level of the ramp signal RAMP is the same as a level of the pixel signal, output a comparison signal, which transitioned from a first level (for example, logic high) to a second level (for example, logic low). A time point, at which a level of the comparison signal transitioned, may be determined according to the level of the pixel signal PXS.

The CDS circuit may sample and hold the pixel signal PXS provided by the pixel PX according to the CDS method, double sample levels of particular noise (for example, the reset signal) and a level according to the image signal, and generate the comparison signal based on a level corresponding to the difference between the levels.

The data bus 320 may output the pixel value pdt output by the ADC circuit 310 after temporarily storing the pixel value pdt. The data bus 320 may include a plurality of column memories and a column decoder. A plurality of pixel values stored in the plurality of column memories may be output to the image signal processor 600 in the image sensor 10 under control by the column decoder.

The image signal processor 600 may receive the pixel value pdt. The image signal processor 600 may perform an image processing operation on the pixel value pdt. The image processing operation may include a high dynamic range (HDR) processing operation. The image signal processor 600 may perform the HDR processing operation on the pixel value pdt and generate output image data OIDT. The image signal processor 600 may receive the sub pixel value and the full pixel value. The image signal processor 600 may compensate for the full pixel value of a saturation pixel group by performing the HDR processing operation on the pixel value pdt.

The image signal processor 600 may generate (e.g., may obtain) a color ratio. As an example, the image signal processor 600 may generate the color ratio of the saturation pixel group by using a target sub pixel value. The saturation pixel group may mean a pixel group having the saturation pixel value among the pixel groups, and the target sub pixel value may mean the sub pixel value generated by the saturation pixel group as the sub pixel value corresponding to the saturation pixel group.

The image signal processor 600 may convert the target sub pixel value into sub color data of each of a plurality of colors of the saturation pixel group. In this regard, the target sub pixel value of a representative color may be converted into sub color data of each of the plurality of colors. The image signal processor 600 may generate the color ratio based on sub color data of each of the plurality of colors. For example, the image signal processor 600 may convert the target sub pixel value into sub color data of the representative color, sub color data of a first color, and sub color data of a second color, and generate the color ratios between the representative color, the first color, and the second color. The image signal processor 600 may generate the color ratio between the first color and the representative color, the color ratio between the second color and the representative color, and the color ratio between the second color and the first color.

The image signal processor 600 may generate the output image data OIDT by compensating for the full pixel value of the saturation pixel group based on the color ratio of the saturation pixel group. The image signal processor 600 may detect an unsaturated color component among the color components corresponding to the full pixel value of the saturation pixel group. As an example, the image signal processor 600 may convert the full pixel value of the saturation pixel group into color data of each of the plurality of colors. In this regard, the full pixel value of a representative color may be converted into color data of each of the plurality of colors. The image signal processor 600 may detect an unsaturated color component by determining whether the color data of any of the plurality of colors is saturated.

The image signal processor 600 may compensate for the full pixel value of the saturation pixel group based on the color ratio of the unsaturated color. For example, when the unsaturated color component is the first color, the image signal processor 600 may compensate for the full pixel value of the saturation pixel group based on the color ratio between the representative color and the first color. When there is no unsaturated color component, the image signal processor 600 may compensate for the full pixel value of the saturation pixel group based on the target sub pixel value.

The image sensor 10 may compensate for the full pixel value of the saturation pixel group with a more accurate value by generating the color ratio of the saturation pixel group by using the sub pixel value, and by compensating for the full pixel value of the saturation pixel group based on the color ratio of the saturation pixel group, and may perform the HDR processing operation on the pixel value with improved reliability.

Figure 2:
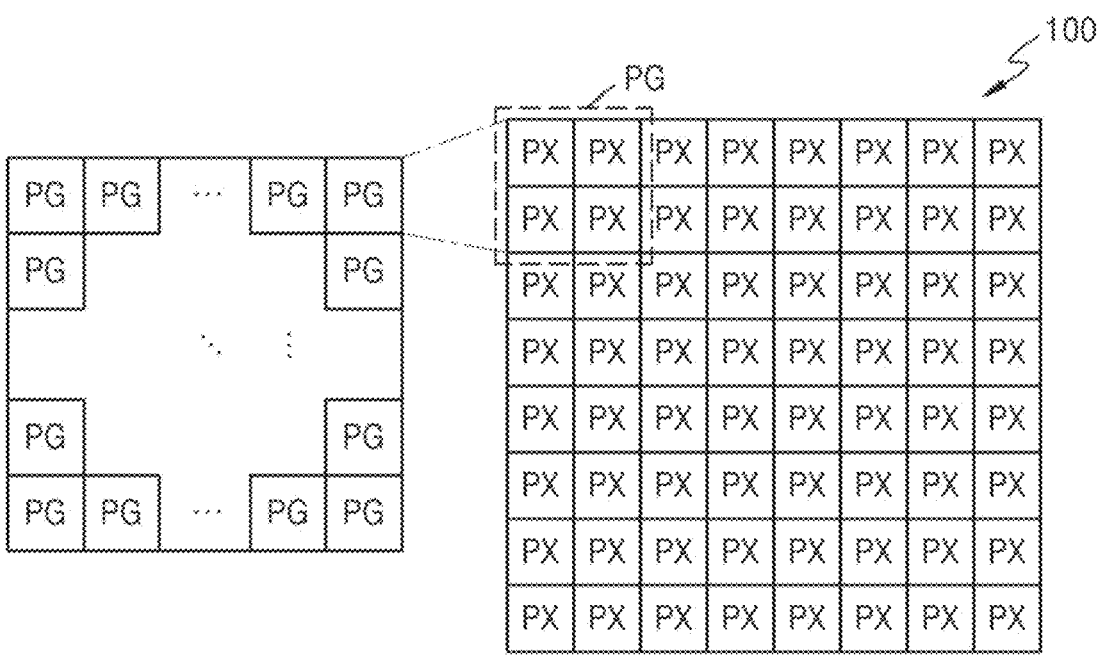
FIG. 2 is a diagram of a pixel array according to an example embodiment.

FIG. 2 is a diagram of the pixel array 100 according to an example embodiment.

Referring to FIG. 2, the pixel array 100 may include a plurality of pixel groups PG each including two or more pixels PX adjacent to each other. As an example, each pixel group PG may include four pixels PX. However, example embodiments are not necessarily limited thereto, and each pixel group PG may include various numbers of pixels PX, such as 2, 9, and 16. For example, the pixel array 100 may include a plurality of pixel groups PG each including pixels PX arranged in an n×n matrix (n is a positive integer). However, example embodiments are not limited thereto, and the pixel array 100 may include the plurality of pixel groups PG each including pixels PX arranged in a 2n×2n matrix (n is a positive integer).

The full pixel signal may include a signal obtained by summing pixel signals in units of pixel groups PG of all pixels PX included in each of the pixel groups PG. For example, when the image sensor 10 performs the binning operation, the pixel signals of pixels PX included in the pixel group PG may be summed to be output as the full pixel signal.

The sub pixel signal may include a signal obtained by summing pixel signals in units of pixel groups PG of some pixels PX included in each of the pixel groups PG. As an example, the sub pixel signal may include a signal generated for the image sensor 10 to perform an autofocus function.

For example, when the image sensor 10 performs the autofocus function operation, the pixel signals of some pixels PX included in the pixel group PG may be summed to be output as the sub pixel signal. However, example embodiments are not necessarily limited thereto, and the sub pixel signal may also be output when the image sensor 10 performs the binning operation.

Figure 3A:
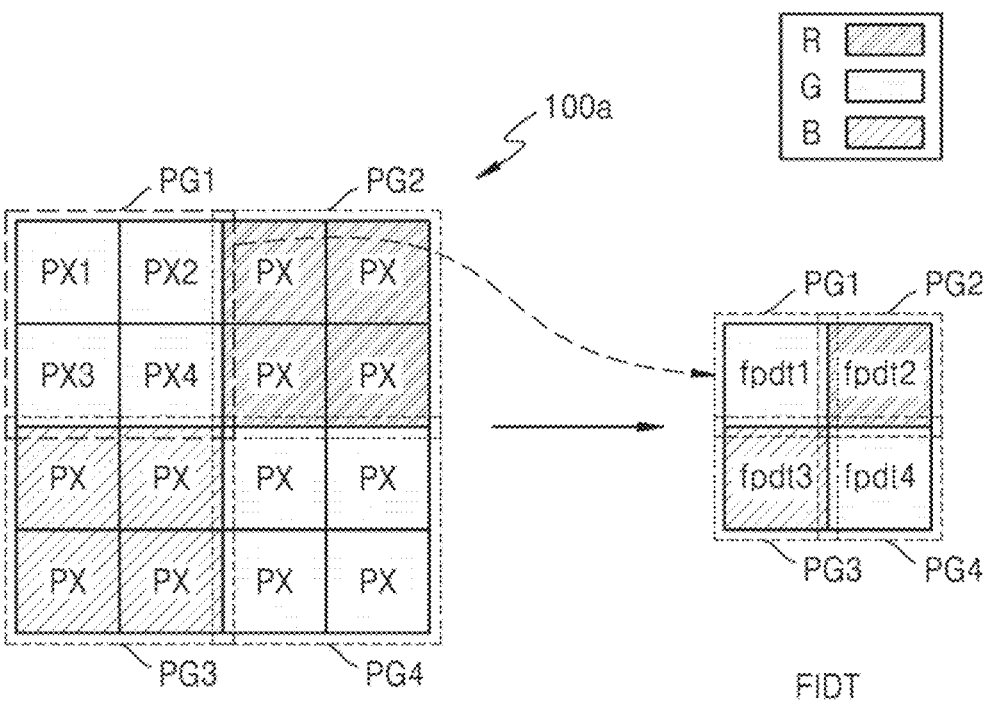
FIG. 3A is a diagram of pixel groups of a pixel array, according to an example embodiment.
Figure 3A:
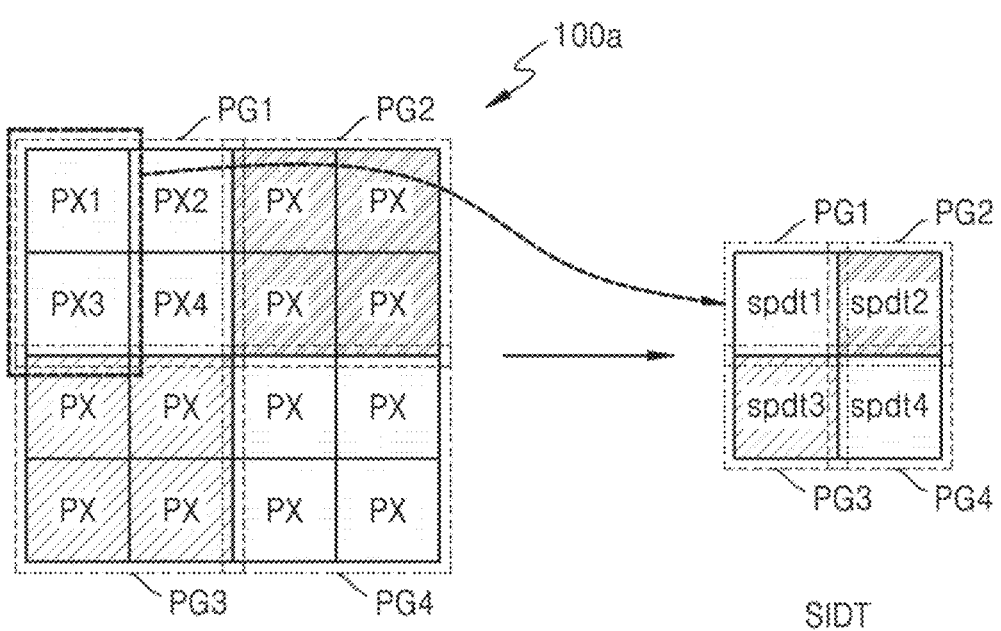

FIG. 3A is a diagram of pixel groups of a pixel array 100a, according to an example embodiment. The pixel array 100a has a tetra pattern and is an example of a portion of the pixel array 100 in FIG. 1. Hereinafter, FIGS. 1 and 3A are referred to together. Although the pixel array 100a is illustrated to have a tetra pattern in FIG. 3A, the image sensor 10 may be applied to a pixel PX array having another pattern.

The pixel array 100a may include a plurality of pixel groups PG, for example, first through fourth pixel groups PG1 through PG4. Each of the plurality of pixel groups (for example, the first through fourth pixel groups PG1 through PG4) may include n×n pixels PX. For example, each of the first to fourth pixel groups PG1 to PG4 may include four pixels PX arranged in two rows and two columns (that is, 2×2). As an example, each of the first through fourth pixel groups PG1 through PG4 may include one microlens arranged on four pixels PX. Although the pixel array 100a is illustrated as including four pixel groups PG in FIG. 3A, this is only for convenience of description, and the pixel array 100a may include various numbers of pixel groups PG.

As an example, the pixel signal generated by each of the four pixels PX included in one pixel group PG, in which one microlens is arranged, may vary due to the shape and refractive index of the microlens. At least some of the four pixels PX included in one pixel group PG may include pixels PX for an auto focusing (AF) function.

The pixel array 100a may include a color filter for sensing various colors. The same color filter may be arranged on n×n pixels PX included in each of the pixel groups PG. As an example, each of the first through fourth pixel groups PG1 through PG4 may include one of a green G color filter, a red R color filter, and a blue B color filter. In some example embodiments, in the pixel array 100a, an arrangement ratio of the red R color filter, the green G color filter, and the blue B color filter may be 1:2:1. For example, a green G color filter may be provided on each of the pixels in the first pixel group PG1. For example, a red R color filter may be provided on each of the pixels in the second pixel group PG2. For example, a blue B color filter may be provided on each of the pixels in the third pixel group PG3. For example, a green G color filter may be provided on each of the pixels in the fourth pixel group PG4.

The pixels of the plurality of pixel groups PG (for example, the first through fourth pixel groups PG1 through PG4) included in the pixel array 100a may include the same color filter in units of pixel groups. In this regard, four pixels PX arranged adjacent to each other in the pixel array 100a may include the same color filter. As an example, the pixel array 100a may have a tetra pattern. For example, the first pixel group PG1 and the fourth pixel group PG4 may include the green G color filter. The second pixel group PG2 may include the red R color filter. The third pixel group PG3 may include the blue B color filter. However, example embodiments are not limited thereto, and each of the first through fourth pixel groups PG1 through PG4 may also include at least one of a white color filter, a yellow color filter, a cyan color filter, and a magenta color filter. Alternatively, each of the first through fourth pixel groups PG1 through PG4 may also include a white color filter, a yellow color filter, the green G color filter, the red R color filter, and the blue B color filter.

Referring to FIGS. 1 and 3A together, the image sensor 10 may generate image data. The readout circuit 300 may generate image data including pixel values pdt. The image data may include full image data FIDT and sub image data SIDT. The full image data FIDT may include the full pixel value of each of the pixel groups PG. The full pixel value may be generated based on the pixel signals of all pixels PX included in each pixel group PG. As an example, the full pixel signal may include a signal obtained by summing pixel signals of all pixels PX included in each of the pixel groups PG.

The readout circuit 300 may generate the full image data FIDT based on the full pixel signals of the first through fourth pixel groups PG1 through PG4. The full image data FIDT may include a first full pixel value fpdt1, a second full pixel value fpdt2, a third full pixel value fpdt3, and a fourth full pixel value fpdt4. The first full pixel value fpdt1, the second full pixel value fpdt2, the third full pixel value fpdt3, and the fourth full pixel value fpdt4 may correspond to the first pixel group PG1, the second pixel group PG2, the third pixel group PG3, and the fourth pixel group PG4, respectively. The full image data FIDT may include the full pixel values of the representative color corresponding to each pixel group PG. Color of each pixel value included in the image data may be referred to as the representative color. For example, because the first pixel group PG1 corresponds to a green G color, the first full pixel value fpdt1 may be the full pixel value of the green G color that is the representative color. Because the second pixel group PG2 corresponds to a red R color, the second full pixel value fpdt2 may include the full pixel value of the red R color of the representative color.

For example, the pixel array 100a may output a first full pixel signal from pixels included in the first pixel group PG1. The pixel array 100a may output the first full pixel signal by summing pixel signals generated by each of a first pixel PX1, a second pixel PX2, a third pixel PX3, and a fourth pixel PX4 included in the first pixel group PG1. The first full pixel value fpdt1 may be generated based on the first full pixel signal generated by the first pixel PX1, the second pixel PX2, the third pixel PX3, and the fourth pixel PX4 included in the first pixel group PG1. In this manner, the second full pixel value fpdt2, the third full pixel value fpdt3, and the fourth full pixel value fpdt4 may also be generated.

The sub image data SIDT may include the sub pixel value of each of the pixel groups PG. The sub pixel value may be generated based on the pixel signals of some pixels PX included in each of the pixel groups PG. As an example, the sub pixel signal may include the pixel value obtained by summing the pixel signals of some pixels PX included in each of the pixel groups PG.

The readout circuit 300 may generate the sub image data SIDT based on the sub pixel signals of the first through fourth pixel groups PG1 through PG4. The sub image data SIDT may include a first sub pixel value spdt1, a second sub pixel value spdt2, a third sub pixel value spdt3, and a fourth sub pixel value spdt4. The first sub pixel value spdt1, the second sub pixel value spdt2, the third sub pixel value spdt3, and the fourth sub pixel value spdt4 may correspond to the first pixel group PG1, the second pixel group PG2, the third pixel group PG3, and the fourth pixel group PG4, respectively. The sub image data SIDT may include the sub pixel values of the representative color corresponding to each pixel group PG. For example, because the first pixel group PG1 corresponds to the green G color, the first sub pixel value spdt1 may be the sub pixel value of the green G color that is the representative color.

For example, the pixel array 100a may output a first sub pixel signal from some pixels included in the first pixel group PG1. For example, the pixel signals of one or more pixels PX included in the first pixel group PG1 may be excluded from the summing of the pixel signals for obtaining the first sub pixel value spdt1. The pixel array 100a may output the first sub pixel signal by summing the pixel signals generated by each of the first pixel PX1 and the third pixel PX3 included in the first pixel group PG1. Although the sub pixel signal is generated by two vertically adjacent pixels in one pixel group PG in FIG. 3A, example embodiments are not necessarily limited thereto, and the sub pixel signal may also be generated by a combination of various patterns and various numbers of pixels. The first sub pixel value spdt1 may be generated based on the first sub pixel signal generated by the first pixel PX1 and the third pixel PX3 included in the first pixel group PG1. In this manner, the second sub pixel value spdt2, the third sub pixel value spdt3, and the fourth sub pixel value spdt4 may also be generated.

Figure 3B:
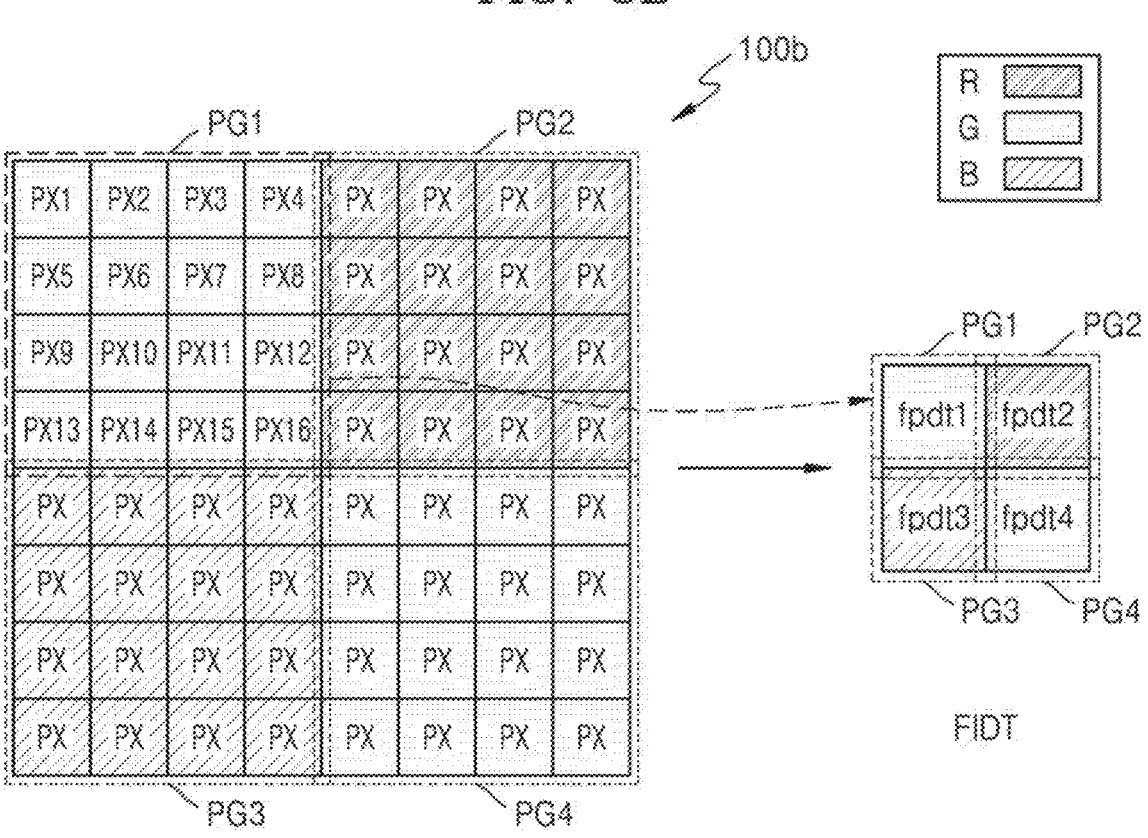
FIG. 3B is a diagram of pixel groups of a pixel array, according to an example embodiment.
Figure 3B:
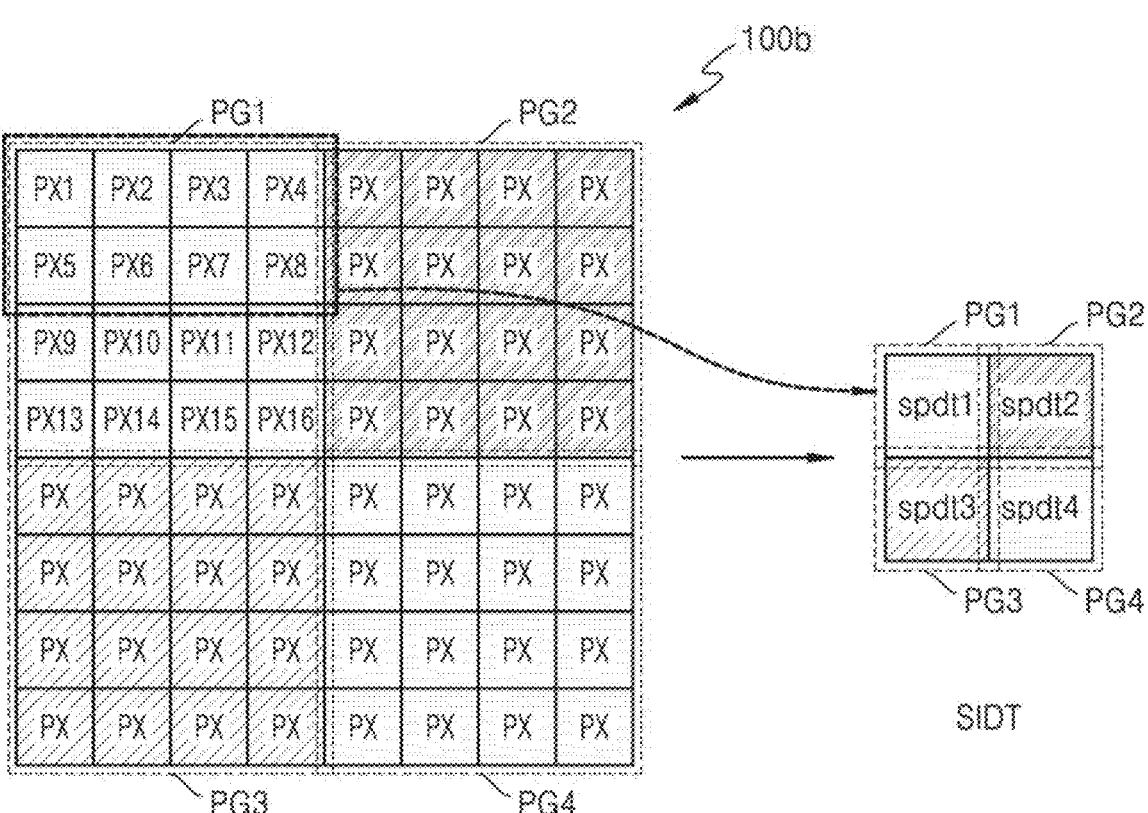

FIG. 3B is a diagram of pixel groups PG of a pixel array 100b, according to an example embodiment. The pixel array 100b has a hexadeca pattern and is an example of a portion of the pixel array 100 in FIG. 1. Hereinafter, FIGS. 1 and 3B are referred to together.

Each of the first through fourth pixel groups PG1 through PG4 may include sixteen pixels PX arranged in four rows and four columns (that is, 4×4). As an example, in each of the first through fourth pixel groups PG1 through PG4, a microlens may be arranged in units of four pixels PX among 16 pixels PX included in each pixel group PG. Each of the first through fourth pixel groups PG1 through PG4 may include four microlenses. The first pixel group PG1 and the fourth pixel group PG4 may include the green G color filter. The second pixel group PG2 may include the red R color filter. The third pixel group PG3 may include the blue B color filter. However, example embodiments are not necessarily limited thereto.

The pixel array 100b may output the first full pixel signal from pixels included in the first pixel group PG1. The pixel array 100b may generate the first full pixel signal by summing pixel signals generated by each of first through sixteenth pixels PX1 through PX16 included in the first pixel group PG1, and may generate the first full pixel value fpdt1 based on the first full pixel signal. In this manner, the second full pixel value fpdt2, the third full pixel value fpdt3, and the fourth full pixel value fpdt4 may also be generated.

For example, the pixel array 100b may output the first sub pixel signal from some pixels included in the first pixel group PG1. The pixel array 100b may output the first sub pixel signal by summing the pixel signals generated by each of the first through eighth pixels PX1 through PX8 included in the first pixel group PG1. However, example embodiments are not necessarily limited thereto, and the sub pixel signal may also be generated by using a combination of various patterns and various pixel numbers. The first sub pixel value spdt1 may be generated based on the first sub pixel signal. In this manner, the second sub pixel value spdt2, the third sub pixel value spdt3, and the fourth sub pixel value spdt4 may also be generated.

Figure 4:
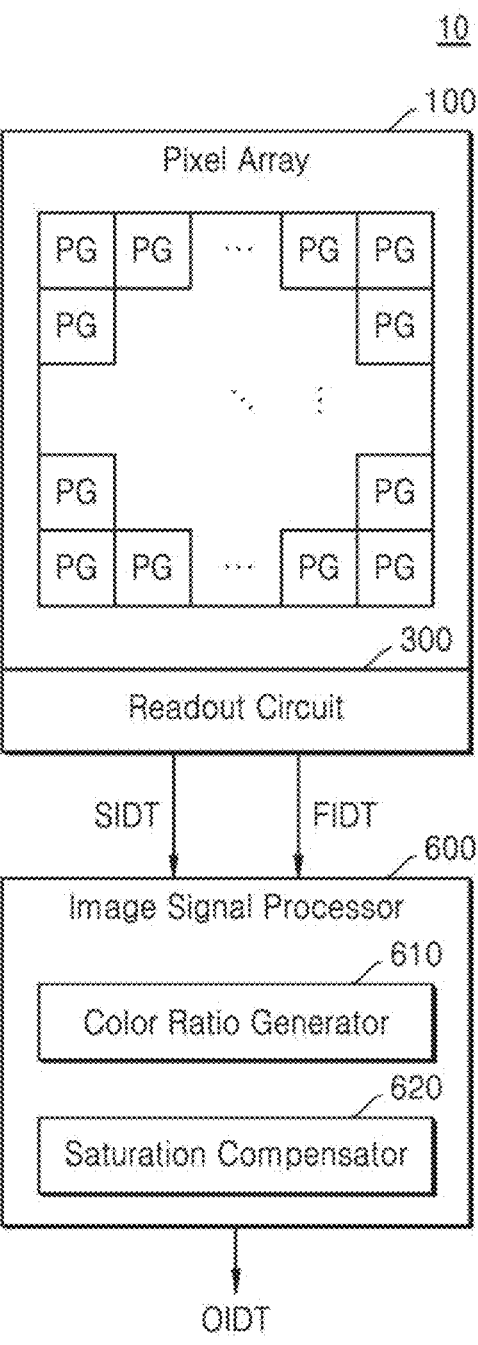
FIG. 4 is a diagram of an image signal processor according to an example embodiment.

FIG. 4 is a diagram of an image signal processor 600 according to an example embodiment. Duplicate descriptions given with reference to FIG. 1 are omitted.

Referring to FIG. 4, the image signal processor 600 may receive the sub image data SIDT and the full image data FIDT. The sub image data SIDT may include the sub pixel values for each of the pixel groups PG, and the full image data FIDT may include the full pixel values for each of the pixel groups PG.

The image signal processor 600 may include a color ratio generator 610 and a saturation compensator 620. The color ratio generator 610 may generate the color ratios based on the sub image data SIDT. The color ratio may mean a ratio occupied between a plurality of color components in the image data corresponding to each pixel group PG.

The image signal processor 600 may generate the color ratio of each of the plurality of pixel groups PG. The color ratio generator 610 may receive the sub image data SIDT, and generate the color ratio of each of the pixel groups PG by using the sub image data SIDT. The color ratio generator 610 may generate the color ratio of each pixel group PG by using the sub pixel value included in the sub image data SIDT.

The color ratio generator 610 may generate the sub image data SIDT as the sub color data of each of the plurality of colors by using full color estimation, and in this regard may control a full color estimation operation. The color ratio generator 610 may generate the color ratio of each of the pixel groups PG by using the sub color data of each of the plurality of colors. As an example, the color ratio generator 610 may perform a demosaicing operation on the sub image data SIDT, and convert the demosaiced sub image data SIDT into sub color data of each of the representative color, the first color, and the second color. The color ratio generator 610 may generate the color ratios of each of the pixel groups PG by using the sub color data corresponding to each pixel group PG. For example, the color ratio generator 610 may generate the color ratios between the representative color, the first color, and the second color of each of the pixel groups PG.

The image signal processor 600 may generate the color ratio of the saturation pixel group. The color ratio generator 610 may generate the color ratio of the saturation pixel group by using the target sub pixel value. In this regard, the color ratio generator 610 may also generate only the color ratios of the saturation pixel group based on the target sub pixel value. The target sub pixel value may mean the sub image data SIDT corresponding to the saturation pixel group.

The color ratio generator 610 may generate the sub color data of each of the plurality of colors of the saturation pixel group based on the target sub pixel value by using the full color estimation operation. The color of the target sub pixel value may be referred to as the representative color. The color ratio generator 610 may generate the sub color data of each of the representative color, the first color, and the second color based on the sub pixel value of the representative color. The color ratio generator 610 may generate the sub color data by using the full color estimation operation based on the target sub pixel value and the sub pixel value of periphery pixels of the saturation pixel group. The color ratio generator 610 may generate the sub color data of each of the representative color, the first color, and the second color by using the target sub pixel value and the sub pixel value of a color different from the representative color of the periphery pixels. As an example, the color ratio generator 610 may convert the target sub pixel value into sub color data of each of the representative color, the first color, and the second color by performing the demosaicing operation on the target sub pixel value. For example, the color ratio generator 610 may generate the color ratio between the representative color, the first color, and the second color of the saturation pixel group.

The saturation compensator 620 may compensate for the full image data FIDT based on the color ratio generated by the color ratio generator 610. The saturation compensator 620 may compensate for the full image data FIDT corresponding to the saturation pixel group based on the color ratio of the saturation pixel group. In this regard, the saturation compensator 620 may compensate for the full pixel value of the saturation pixel group based on the color ratio of the saturation pixel group. The saturation compensator 620 may compensate for the full pixel value of the saturation pixel group from the full image data FIDT and output the compensation result as the output image data OIDT.

The image signal processor 600 may detect the saturation pixel group. The saturation compensator 620 may detect the saturation pixel group. However, example embodiments are not necessarily limited thereto, and the saturation pixel group may be detected by another component. The saturation pixel group is described in detail below with reference to FIG. 5.

When the saturation pixel group is detected, the saturation compensator 620 may convert the full image data FIDT corresponding to the saturation pixel group into color data of each of the plurality of colors, and may determine whether the color data of any of the plurality of colors has been saturated. The saturation compensator 620 may convert the full pixel value of the saturation pixel group into color data of each of the plurality of colors. The color of the full pixel value of the saturation pixel group may include the representative color. For example, the saturation compensator 620 may convert the full pixel value of the saturation pixel group into color data of each of the representative color, the first color, and the second color.

The saturation compensator 620 may determine which color data is saturated among the color data of each of the representative color, the color data, and the second color of the saturation pixel group. The saturation compensator 620 may determine whether the color data of each of the first color and the second color of the saturation pixel group is saturated. Because the pixel group having the full pixel value that is saturated in the full image data FIDT corresponds to the saturation pixel group, whether the color data of the representative color is saturated may not be determined.

The saturation compensator 620 may compensate for the full pixel value of the saturation pixel group based on the color ratio of an unsaturated color, in the color data of the saturation pixel group. For example, when the first color data of the saturation pixel group is not saturated, the saturation compensator 620 may receive the color ratio of the first color from the color ratio generator 610, and compensate for the full pixel value of a saturation pixel group based on the color ratio of the first color.

When the saturation compensator 620 determines whether the color data of any of the plurality of colors is saturated, the color ratio generator 610 may also generate only the color ratio of the unsaturated color. For example, color ratios corresponding to a saturated color may not be generated. Because the saturation compensator 620 compensates for the full pixel value of the saturation pixel group based on the color ratio of the unsaturated color, the color ratio generator 610 may also generate only the color ratio of the unsaturated color. The color ratio generator 610 may generate the color ratio of the unsaturated color that has been determined by using the color data and the target sub pixel value. For example, the saturation compensator 620 may determine that the first color is saturated, by using the color data of the first color and the color data of the second color. The color ratio generator 610 may generate the color ratio between the representative color and the second color by using the target sub pixel value.

The sub-image data SIDT has lower sensitivity than the full image data FIDT, and may include image information about a relatively bright area. Accordingly, a saturation area (or pixel group) in the full image data FIDT may not be saturated in the sub image data SIDT, and the color ratio of the corresponding area may be obtained by using the sub image data SIDT. The image sensor 10 may perform high dynamic image processing with improved reliability and accuracy by compensating for the saturation area by using the color ratio for the saturation area. In addition, the sub image data SIDT may be read out for an autofocus function or the like, and the saturation area may be compensated for at a low processing cost.

Figure 5:
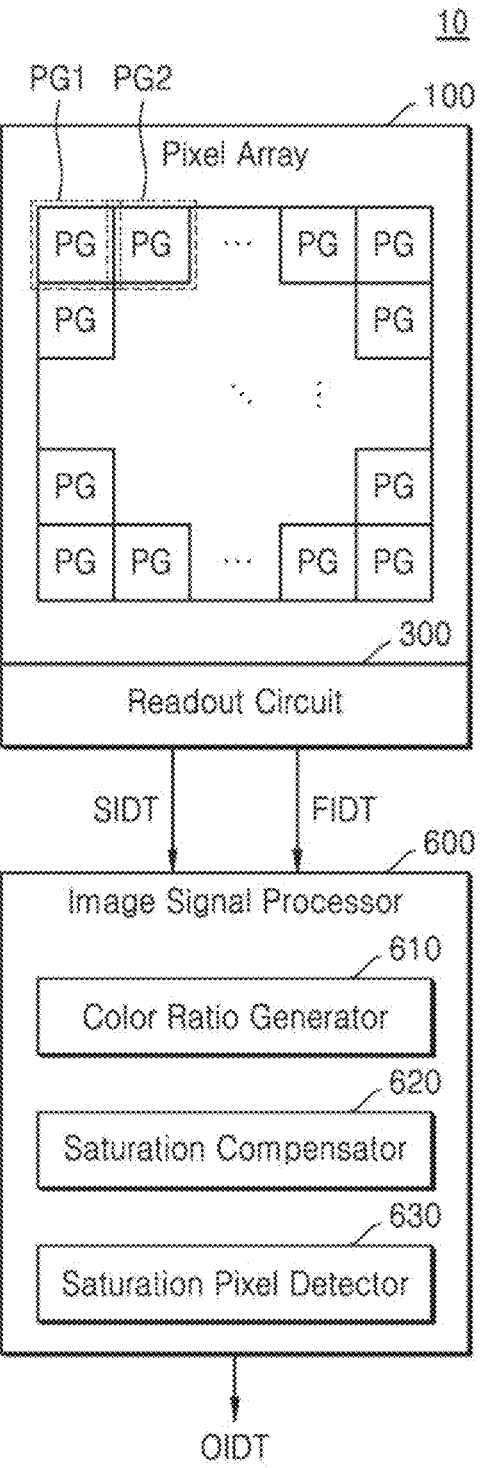
FIG. 5 is a block diagram of an image signal processor including a saturation pixel detector according to an example embodiment.

FIG. 5 is a block diagram of an image signal processor including a saturation pixel detector 630 according to an example embodiment. Duplicate descriptions in the descriptions given above are omitted.

Referring to FIG. 5, the image signal processor 600 may include the color ratio generator 610 and the saturation compensator 620. The image signal processor 600 may further include the saturation pixel detector 630. The saturation pixel detector 630 may detect the saturation pixel group among the pixel groups PG included in the pixel array 100. A saturation pixel group may mean a pixel group which has generated a saturation full pixel value among the full pixel values generated by each of the pixel groups. Although the saturation pixel detector 630 is illustrated separate from the color ratio generator 610 and the saturation compensator 620 in FIG. 5, example embodiments are not necessarily limited thereto, and the saturation pixel detector 630 may also be included in the saturation compensator 620 or the color ratio generator 610.

The saturation pixel detector 630 may detect, as the saturation pixel group, the pixel group generating the full pixel value greater than or equal to a threshold value among the full pixel values of each of the plurality of pixel groups. A method of detecting the saturation pixel group is described below with reference to FIG. 7.

Figure 6:
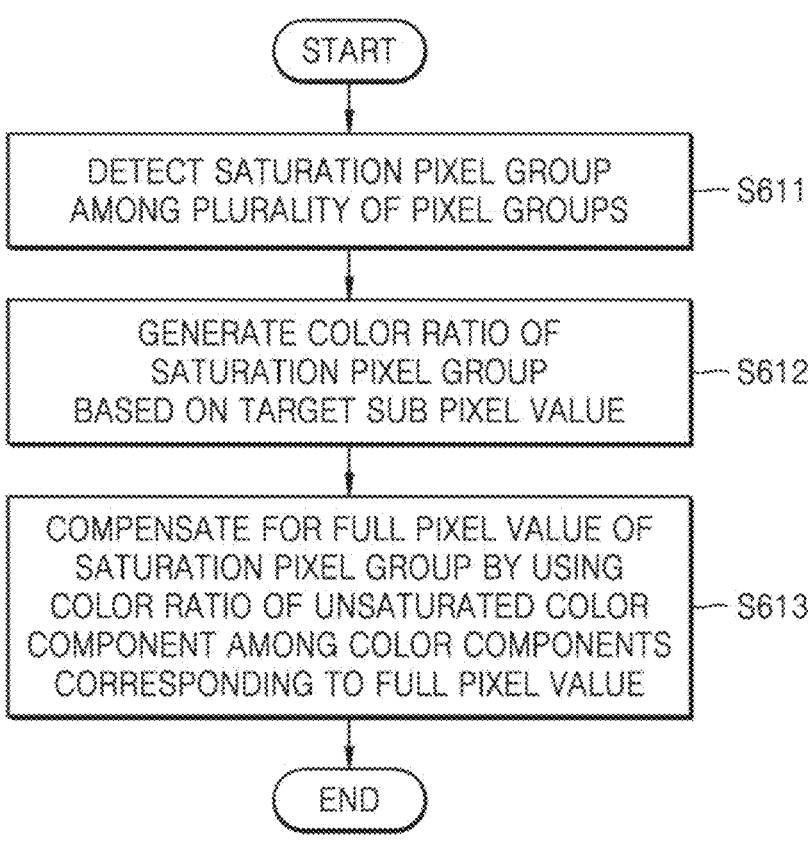
FIG. 6 is a flowchart of a method of operating an image sensor, according to an example embodiment.

FIG. 6 is a flowchart of a method of operating an image sensor, according to an example embodiment. FIG. 6 illustrates a method of operating the image signal processor 600 in FIG. 5.

Referring to FIG. 6, in operation S611, an image signal processor may detect a saturation pixel group among a plurality of pixel groups. The image signal processor may receive full pixel values generated based on pixel signals of pixels included in each of the plurality of pixel groups. The image signal processor may detect the saturation pixel group among the plurality of pixel groups by using the full pixel values.

In operation S612, the image signal processor may generate color ratios of the saturation pixel group based on a target sub pixel value. The target sub pixel value may include the pixel value generated based on the pixel values of some pixels included in the saturation pixel group.

In operation S613, the image signal processor may compensate for the full pixel value of the saturation pixel group by using the color ratio. The image signal processor may use the color ratio of an unsaturated color component among the color components corresponding to the full pixel value.

According to an example embodiment, when there is no unsaturated color component, the image signal processor may also not use the color ratio.

Figure 7:
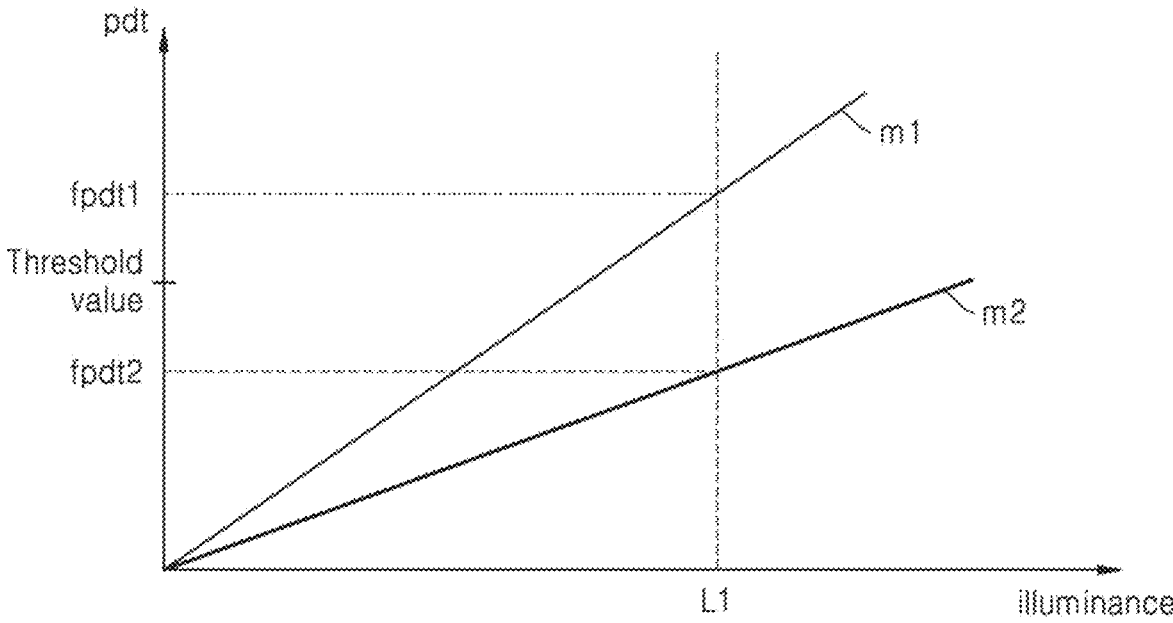
FIG. 7 illustrates a graph of saturation of a pixel value, according to an example embodiment.

FIG. 7 illustrates a graph of saturation of the pixel value pdt, according to an example embodiment. Referring to FIG. 7, the horizontal axis of the graph of FIG. 7 indicates illuminance and the vertical axis thereof indicates the pixel value pdt. Hereinafter, FIG. 7 is described with reference to FIG. 5.

Referring to FIGS. 5 and 7, a first line m1 may represent the full pixel value of the first pixel group PG1 with respect to illuminance. At a first illuminance L1, the full pixel value of the first pixel group PG1 may be the first full pixel value fpdt1. A second line m2 may represent the full pixel value of the second pixel group PG2 with respect to illuminance. At the first illuminance L1, the full pixel value of the second pixel group PG2 may be the second full pixel value fpdt2.

The saturation pixel detector 630 may detect, as the saturation pixel group, the pixel group generating the full pixel value greater than or equal to a threshold value among the full pixel values of each of the plurality of pixel groups. The first full pixel value fpdt1 at the first illuminance L1 may be equal to or greater than a threshold value, and the second full pixel value fpdt2 at the first illuminance L1 may be less than the threshold value. The saturation pixel detector 630 may detect the first pixel group PG1 as the saturation pixel group. The saturation compensator 620 may compensate for the first full pixel value fpdt1.

Figure 8:
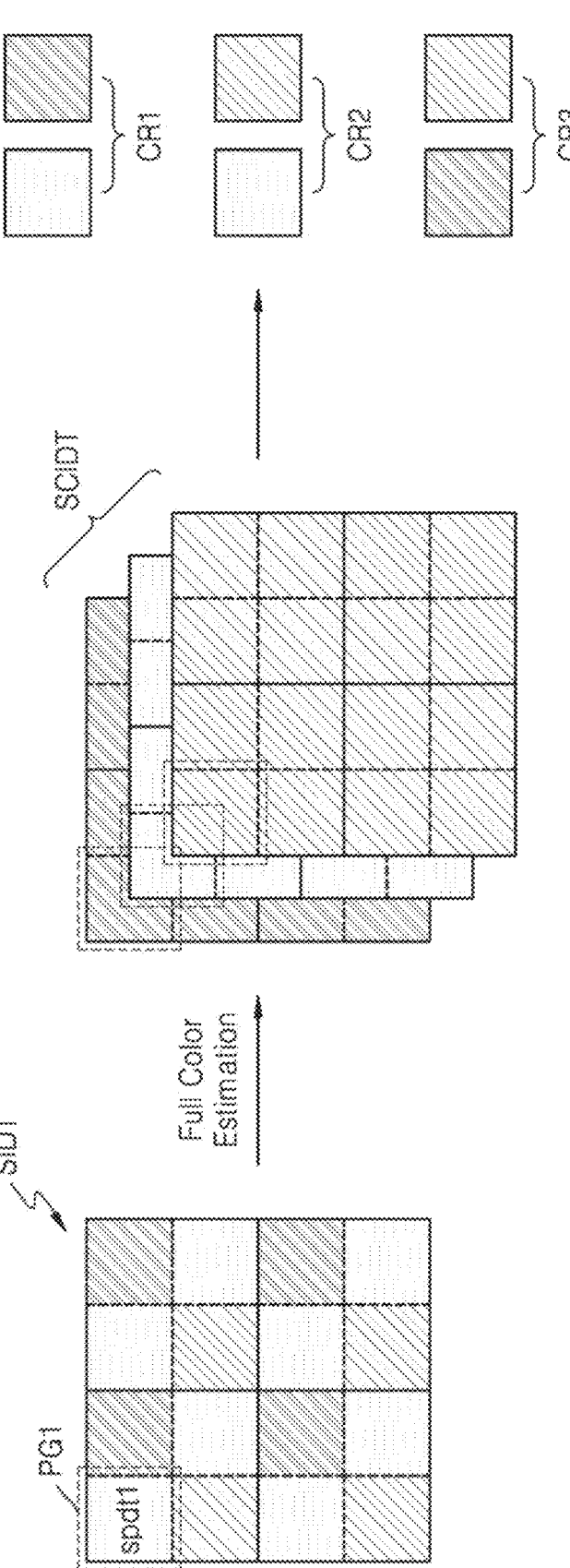
FIG. 8 is a diagram of a method of generating a color ratio, according to an example embodiment.

FIG. 8 is a diagram of a method of generating a color ratio, according to an example embodiment. FIG. 8 illustrates an operation of the color ratio generator (for example, the color ratio generator 610 in FIG. 4). For convenience of description, a case is assumed in which a color ratio generator generates a color ratio of a saturation pixel group. Duplicate descriptions given with reference to FIG. 4 are omitted.

In FIG. 8, a case is assumed in which the first pixel group PG1 is detected as the saturation pixel group. The first sub pixel value spdt1 of the first pixel group PG1 may include a target sub pixel value. An image signal processor may generate color ratios of a saturation pixel group. The image signal processor may generate color ratios of the first pixel group PG1. The image signal processor may generate sub color data SCIDT of each of the plurality of colors of the first pixel group PG1 based on the first sub pixel value spdt1 by using a full color estimation operation. As an example, the full color estimation operation may include obtaining a correlation between a plurality of colors, demosaicing treatment operation, etc.

The image signal processor may generate the sub color data SCIDT of each of the representative color, the first color, and the second color based on the first sub pixel value spdt1 of the representative color. The representative color, the first color, and the second color may be different from each other. For example, the representative color of the first sub pixel value spdt1 may include a green color, the first color may include a red color, and the second color may include a blue color. As an example, the image signal processor may perform the demosaicing operation on the first sub pixel value spdt1, and generate sub color data SCIDT of the red color, sub color data SCIDT of the blue color, and sub color data SCIDT of the green color. The image signal processor may generate sub color data SCIDT of each of the green color, the red color, and the blue color by using the first sub pixel value spdt1 and the sub pixel values of the periphery pixels of the first pixel group PG1.

The image signal processor may generate color ratios between the representative color, the first color, and the second color of the first pixel group PG1 by using the sub color data SCIDT. The image signal processor may generate a color ratio between the representative color and the first color as a first color ratio CR1, a color ratio between the representative color and the second color as a second color ratio CR2, and a color ratio between the first color and the second color as a third color ratio CR3. As an example, the image signal processor may generate the first color ratio CR1 between the green color and the red color by using the sub color data of the green color and the sub color data of the red color. The image signal processor may generate the second color ratio CR2 between the green color and the blue color by using the sub color data of the green color and the sub color data of the blue color. The image signal processor may generate the third color ratio CR3 between the blue color and the red color by using the sub color data of the blue color and the sub color data of the red color.

Even when the full pixel value of the saturation pixel group is saturated, the sub pixel value of the saturation pixel group may not be saturation. The image signal processor may accurately obtain the color ratio of the saturation pixel group by using the sub pixel value of the saturation pixel group. The image sensor may compensate for the saturation full pixel value with an accurate pixel value by using the color ratio.

Figure 9:
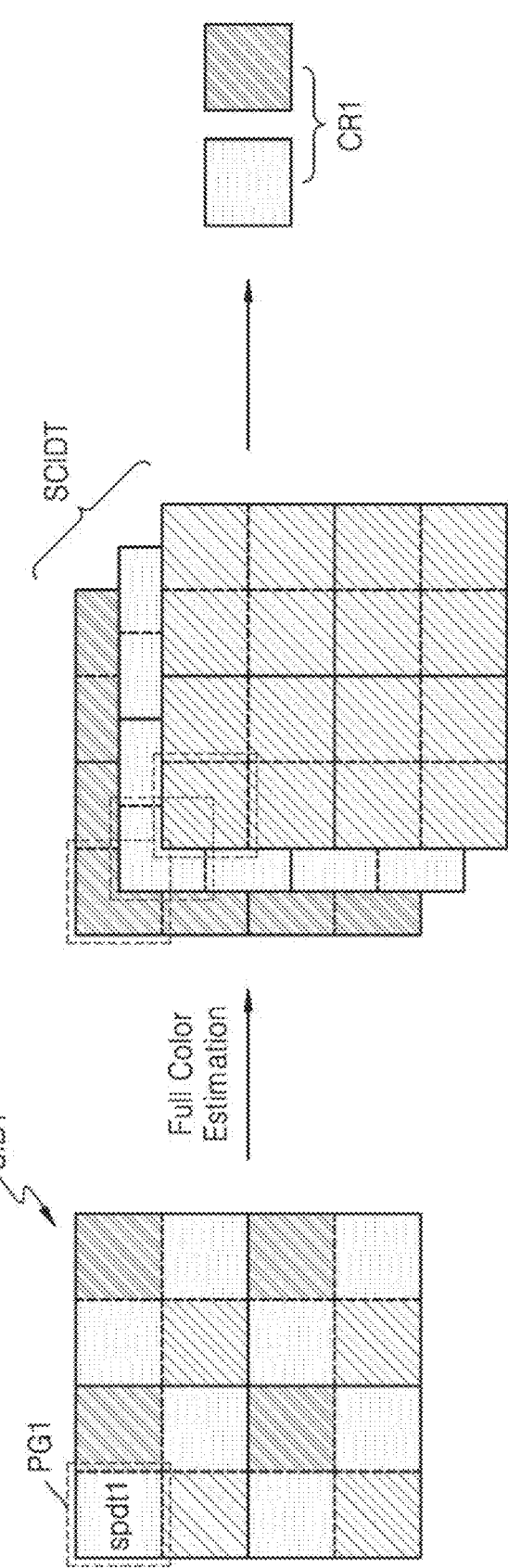
FIG. 9 is a diagram of a method of generating a portion of a color ratio, according to an example embodiment.

FIG. 9 is a diagram of a method of generating a portion of a color ratio, according to an example embodiment. FIG. 9 illustrates an operation of a color ratio generator (for example, the color ratio generator 610 in FIG. 4). In comparison with FIG. 8, a case is illustrated in which only the color ratio of the unsaturated color is generated. Duplicate descriptions given with reference to FIG. 8 are omitted.

When an image signal processor (for example, the saturation compensator 620 in FIG. 4) determines whether the color data of any of the plurality of colors is saturated, an image signal processor (for example, the color ratio generator 610 in FIG. 4) may also generate only the color ratio of the unsaturated color.

The image signal processor may generate the color ratio of the unsaturated color by using the first sub pixel value spdt1. As an example, the image signal processor may determine the second color to be a saturation color, and the image signal processor may generate the color ratio between the representative color and the first color by using the first sub pixel value spdt1. For example, the image signal processor may generate the first color ratio CR1 between the green color and the red color by using the sub color data of the green color and the sub color data of the red color.

Figure 10:
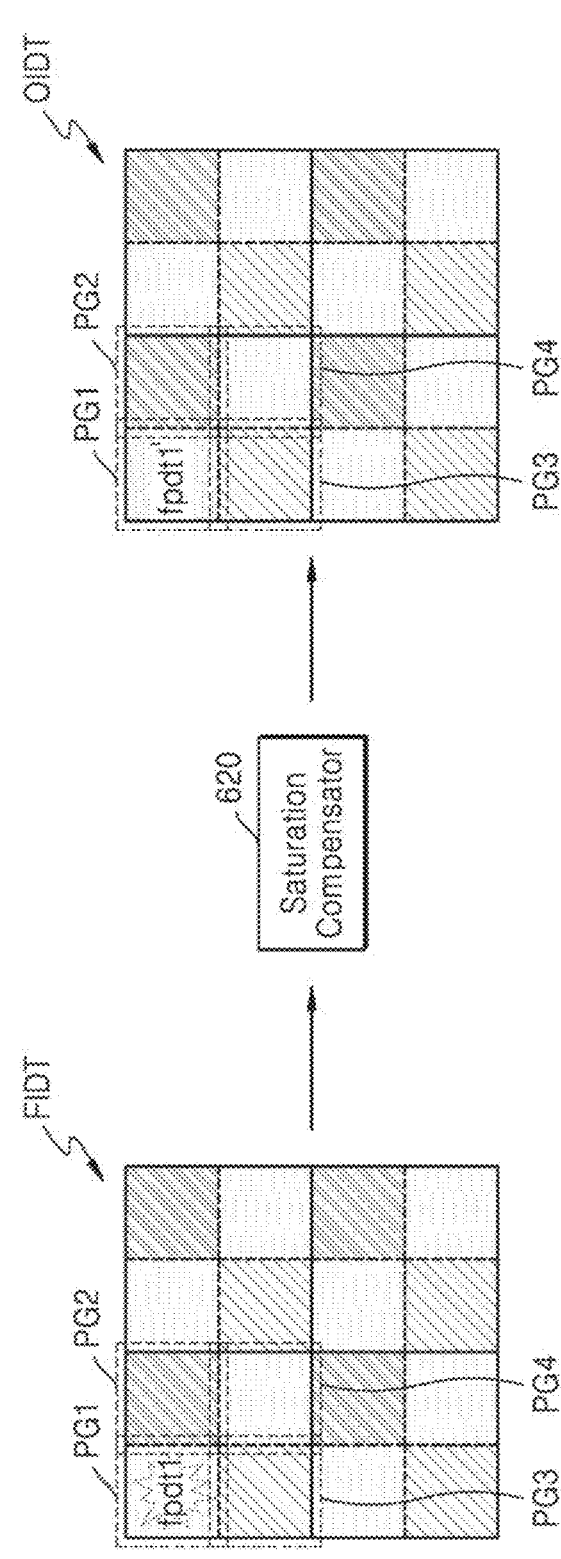
FIG. 10 is a diagram of an operation of a saturation compensator, according to an example embodiment.

FIG. 10 is a diagram of an operation of the saturation compensator, according to an example embodiment. Because the saturation compensator 620 in FIG. 10 corresponds to the saturation compensator 620 in FIG. 4, duplicate descriptions are omitted. In FIG. 10, a case is assumed in which the first pixel group PG1 is detected as the saturation pixel group.

Referring to FIG. 10, the saturation compensator 620 may receive the full image data FIDT. The saturation compensator 620 may compensate for the full image data FIDT based on the color ratio, and generate the output image data OIDT. The saturation compensator 620 may compensate for the first full pixel value fpdt1 as a first full pixel value fpdt1' based on the color ratio of the saturation pixel group.

The saturation compensator 620 may compensate for the full pixel values of the saturation pixel group and the periphery pixel groups. The periphery pixel group may mean the pixel group on the periphery of, or adjacent, the saturation pixel group. For example, the second pixel group PG2, the third pixel group PG3, the fourth pixel group PG4, or the like may be included in the periphery pixel group. The saturation compensator 620 may compensate for the full pixel value of each of the periphery pixel groups by using the color ratio of each of the periphery pixel groups. An image sensor may, by compensating for the full pixel values of the periphery pixel groups also by using the color ratio, provide smooth image at the boundary between the saturation pixel group and the periphery pixel group.

Figure 11:
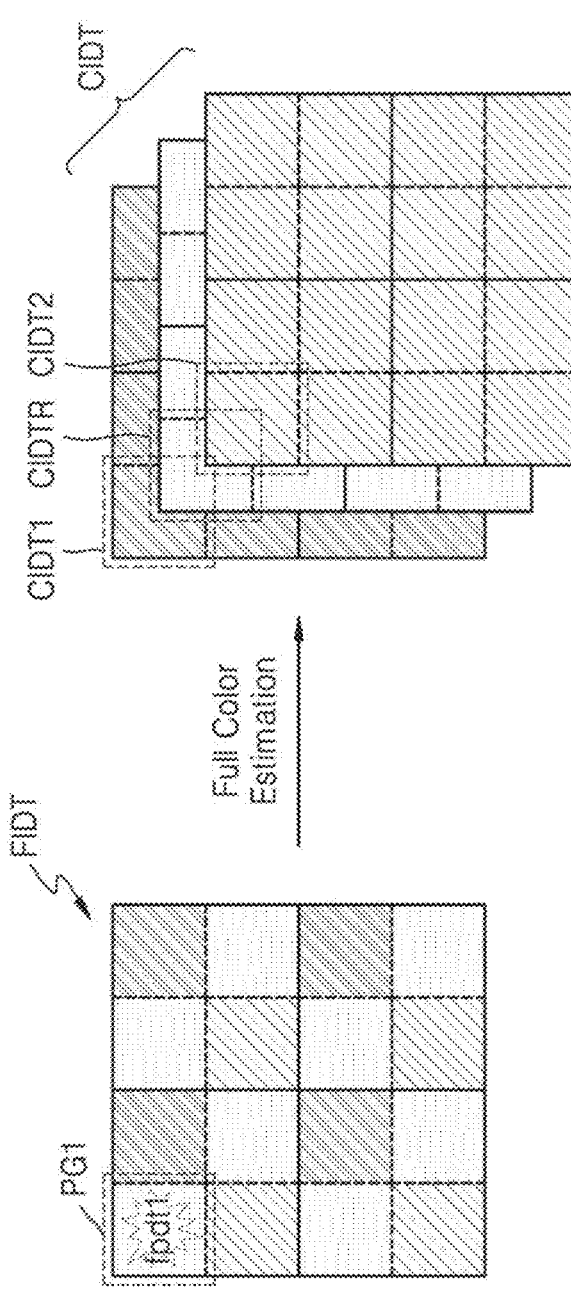
FIG. 11 is a diagram of a method of determining whether color data is saturated, according to an example embodiment.

FIG. 11 is a diagram of a method of determining whether color data is saturated, according to an example embodiment. FIG. 11 illustrates an operation of a saturation compensator. In FIG. 11, a case is assumed in which the first pixel group PG1 is detected as the saturation pixel group. Duplicate descriptions given with reference to FIG. 4 are omitted.

The saturation compensator may generate color data CIDT of each of the plurality of colors of the first pixel group PG1 based on the first full pixel value fpdt1 by using a full color estimation operation. The saturation compensator may generate color data CIDTR of the representative color, color data CIDT1 of the first color, and color data CIDT2 of the second color based on the first full pixel value fpdt1 of the representative color. The representative color, the first color, and the second color may be different from each other. For example, the representative color of the first full pixel value fpdt1 may include a green color, the first color may include a red color, and the second color may include a blue color. The saturation compensator may generate color data by using the full color estimation based on the first full pixel value fpdt1 and the full pixel values of the periphery pixels of the saturation pixel group. The saturation compensator may generate the color data of each of the representative color, the first color, and the second color by using the first full pixel value fpdt1 and the full pixel value that is different from the representative color of the periphery pixels. As an example, the saturation compensator may perform the demosaicing operation on the first full pixel value fpdt1, and generate the color data of a red color, the color data of a blue color, and the color data of a green color.

The saturation compensator may determine whether the color data CIDT of any of the plurality of colors is saturated. The saturation compensator may determine whether the color data CIDT of any of the plurality of colors corresponding to the first pixel group PG1 is saturated. The saturation compensator may determine which color data among the color data CIDTR of the representative color, the color data CIDT1 of the first color, and the color data CIDT2 of the second color is saturated. The saturation compensator may determine whether each of the color data CIDT1 of the first color and the color data CIDT2 of the second color of the first pixel group PG1 is saturated.

The saturation compensator may compensate for the full pixel value of the saturation pixel group based on the color ratio of the unsaturated color, in the color data of the saturation pixel group. The saturation compensator may use the unsaturated color data CIDT when the first full pixel value fpdt1 is compensated for. The saturation compensator may not use the saturated color data CIDT when the first full pixel value fpdt1 is compensated for. Because the saturation compensator does not use the saturated color data CIDT, the saturation compensator may not use the color ratio of the color of the saturated color data.

FIG. 12 is a diagram of a method of generating output image data by using color data, according to an example embodiment. In FIG. 12, a case is assumed in which the first pixel group PG1 is detected as the saturation pixel group. In FIG. 12, a case is assumed in which each of the color data CIDT1 of the first color and the color data CIDT2 of the second color of the first pixel group PG1 is unsaturated. Because the color data CIDT1 of the first color and the color data CIDT2 of the second color are not saturated, the first color and the second color may be unsaturated colors. Duplicate descriptions in the descriptions given above are omitted.

Referring to FIGS. 8 and 12 together, the saturation compensator (for example, the saturation compensator 620 in FIG. 4) may compensate for the full pixel value of the saturation pixel group based on the color data of the unsaturated color and the color ratios of the unsaturated color. The color ratio of the unsaturated color may include one or more color ratios between the unsaturated colors and the representative color, and may include a first color ratio CR1 and a second color ratio CR2. For example, the color ratio of the first color may mean the first color ratio CR1 between the first color and the representative color. The color ratio of the second color may mean the second color ratio CR2 between the second color and the representative color. The saturation compensator may receive the color ratios of the unsaturated color from the color ratio generator (for example, the color ratio generator 610 in FIG. 4). As an example, because the first color and the second color are unsaturated colors, the saturation compensator may receive the first color ratio CR1 and the second color ratio CR2.

The saturation compensator may compensate for the first full pixel value fpdt1 based on the color data CIDT1 of the first color, the first color ratio CR1, the color data CIDT2 of the second color, and the second color ratio CR2, and generate the output image data OIDT. As an example, the saturation compensator may generate a first full pixel value fpdt1' by using Formula 1 below. The first full pixel value fpdt1' may mean the pixel value obtained by compensating for the first full pixel value fpdt1. Formula 1 may be used to compensate for the full pixel value of another saturation pixel group in the full image data FIDT.

$$fpdt' = (w1 \times CIDT1 \times CR1) + (w2 \times CIDT2 \times CR2) \qquad \text{[Formula 1]}$$

In this case, w1 may be a first weight and w2 may be a second weight. The first weight may include a weight for the first color in the first full pixel value fpdt1', and the second weight may include a weight for the second color. For example, the weights may be determined by the saturation compensator based on the number of unsaturated colors. When the first color and the second color are unsaturated colors (i.e., there are two unsaturated colors), because the first color and the second color may be used to generate the first full pixel value fpdt1', the first weight and the second weight may each be about 0.5.

The compensated first full pixel value fpdt1' may be generated based on the color ratios between the full pixel value of other color components, except for the representative color for the first pixel group PG1 and the representative color. Because the representative color is saturated, the representative color may be compensated for by using the color data and the color ratios of the unsaturated colors among the color data corresponding to the saturation pixel group. Compensation may be performed by using the color ratios between the unsaturated color components of the saturation pixel group and the representative color, and accordingly, quality of an image may be improved.

FIG. 13 is a diagram of a method of generating output image data by using color data of an unsaturated color, according to an example embodiment. In FIG. 13, a case is assumed in which the first pixel group PG1 is detected as the saturation pixel group. In FIG. 13, a case is assumed in which the color data of the first color of the first pixel group PG1 is unsaturated and the second color of the first pixel group PG1 is saturated. Because the color data CIDT1 of the first color is not saturated, the first color may be an unsaturated color. Duplicate descriptions given with reference to FIG. 12 are omitted.

Referring to FIGS. 8 and 13, because the first color is an unsaturated color, the saturation compensator may receive the first color ratio CR1 from the color ratio generator. The saturation compensator may compensate for the full pixel value of the saturation pixel group based on the color ratio between the color data of the saturation pixel group and the unsaturated color. As an example, the saturation compensator may compensate for the first full pixel value fpdt1 based on the color data CIDT1 of the first color and the first color ratio CR1, and generate the output image data OIDT. Because the first color is the unsaturated color, the first color may be used for generating the first full pixel value fpdt1'. The second color may not be used for generating the first full pixel value fpdt1'. In Formula 1 described above with respect to FIG. 12, the first weight w1 may be about 1, and the second weight w2 may be about 0.

FIG. 14 is a diagram of a method of generating output image data by using sub pixel values, according to an example embodiment. In FIG. 14, a case is assumed in which the first pixel group PG1 is detected as the saturation pixel group. In FIG. 14, a case is assumed in which the color data of the first color and the color data of the second color of the first pixel group PG1 are not saturated. Duplicate descriptions in the descriptions given above are omitted.

The saturation compensator may compensate for the full pixel value of the saturation pixel group by using the target sub pixel value. The saturation compensator may not have an unsaturated color, and accordingly, may compensate for the full pixel value of the saturation pixel group by using the target sub pixel value instead of the color ratio. As an example, the saturation compensator may not receive the color ratio from the color ratio generator. For example, the saturation compensator may compensate for the first full pixel value fpdt1 by using the first sub pixel value spdt1 (i.e., the target sub pixel value), and generate the output image data OIDT.

The saturation compensator may generate a pixel value, which has been changed from luminance of the target sub pixel value, as the full pixel value of the saturation pixel group. For example, the saturation compensator may increase luminance of the first sub pixel value spdt1, and generate the increased luminance as the first full pixel value fpdt1' of the first pixel group PG1. However, example embodiments are not necessarily limited thereto, and when the color data of the first color and the second color is saturated, the saturation compensator may generate the result as the full pixel value of the saturation pixel group by using various methods. For example, the saturation compensator may map a first full pixel value pdt1 to a preset pixel value, and may also generate the result as the first full pixel value fpdt1'. The image signal processor (for example, the image signal processor 600 in FIG. 4) may also perform additionally a post-processing treatment to match an image alignment of the full image data FIDT and the sub image data SIDT.

The image signal processor may determine whether the target sub pixel value is saturated. The color ratio generator may determine whether the target sub pixel value is saturated. However, example embodiments are not necessarily limited thereto, and the saturation compensator may also determine whether the target sub pixel value is saturated. When the target sub pixel value is saturated, the color ratio generator may not generate the color ratio of the saturation pixel group. In this regard, when the target sub pixel value is saturated, the color ratio generator may not generate the color ratio of the saturation pixel group.

As an example, when the target sub pixel value is saturated, the saturation compensator may compensate for the full pixel value of the saturation pixel group by using the target sub pixel value. The saturation compensator may not receive the color ratio from the color ratio generator. However, example embodiments are not necessarily limited thereto, and when the target sub pixel value is saturated, the saturation compensator may also not use the target sub pixel value.

For example, when the color data of the first color and the second color is saturated and the target sub pixel value is saturated, the saturation compensator may map the first full pixel value fpdt1 to a preset pixel value and may also generate the mapping result as the first full pixel value fpdt1' of the saturation pixel group. The saturation compensator may compensate for the full pixel value of the saturation pixel group by using various methods. In addition, as an example, when the target sub pixel value is saturated, the saturation compensator may also compensate for the full image data FIDT by using the full pixel value of the saturation pixel group, or may also not compensate for the full pixel value.

FIG. 15 is a block diagram of an image system 1 according to an example embodiment.

Referring to FIG. 15, the image system 1 may include an image sensor 10' and an image processing device 600'. The image processing device 600' may correspond to the image signal processor 600 in FIG. 1. As compared with FIG. 1, an image sensor 10' may be external to the image processing device 600'. The image processing device 600' may include a color ratio generator 610', a saturation compensator 620', and a saturation pixel detector 630'.

The image processing device 600' may receive the full image data FIDT and the sub image data SIDT from the image sensor 10'. Because descriptions of the image processing device 600', the color ratio generator 610', the saturation compensator 620', and the saturation pixel detector 630' are substantially the same as descriptions of the image signal processor 600, the color ratio generator 610, the saturation compensator 620, and the saturation pixel detector 630 given with reference to FIGS. 1 through 14, and thus, duplicate descriptions thereof are omitted.

FIG. 16 is a block diagram of an electronic device 1000 according to an example embodiment. For example, the electronic device 1000 may include a mobile terminal.

Referring to FIG. 16, the electronic device 1000 according to an example embodiment may include an application processor (AP) 1200, an image sensor 1100, a display device 1300, a memory 1400, a storage 1500, a user interface 1600, and a wireless transceiver 1700. The descriptions of the image sensors and the operation methods of the image sensors according to example embodiments described with reference to FIGS. 1 through 14 may be applied to the image sensor 1100.

The image sensor 1100 may generate the color ratio of the saturation pixel group based on the target sub pixel value. The image sensor 1100 may detect the unsaturated color component among the plurality of color components corresponding to the full pixel value of the saturation pixel group, and may compensate for the full pixel value of the saturation pixel group by using the color ratio of the unsaturated color component.

The AP 1200 may be provided as a system-on-chip (SoC) which controls the overall operation of the electronic device 1000 and drives an application program, an operating system, etc.

The AP 1200 may receive output data from the image sensor 1100.

The image sensor 1100 may generate image data such as image data, based on the received optical signal, and provide the image data to the AP 1200. The image data may be referred to as the pixel value. The image sensor 1100 may generate HDR-processed image data by using the color ratio.

The memory 1400 may be implemented as a volatile memory, such as dynamic random access memory (RAM) (DRAM) and static RAM (SRAM), or a resistive non-volatile memory, such as ferroelectric RAM (FeRAM), resistive RAM (RRAM), and phase change RAM (PRAM). The memory 1400 may store programs and/or data, which the AP 1200 processes or executes.

The storage 1500 may be implemented as a non-volatile memory, such as an NAND flash memory and resistive memory, and the storage 1500 may be provided as, for example, a memory card (a multi-media card (MMC), an embedded MMC (eMMC), a secure card (SD), and a micro SD), etc. The storage 1500 may store data and/or programs for execution algorithm controlling the image processing operation of the image sensor 1100, and the data and/or programs may be loaded into the memory 1400 when the image processing operation is performed. The storage 1500 may store output image data generated by the image sensor 1100, such as corrected image data or post-processed image data.

The user interface 1600 may be implemented as various devices capable of receiving a user input, such as a keyboard, a curtain key panel, a touch panel, a finger print sensor, and a microphone. The user interface 1600 may receive the user input, and provide a signal corresponding to the received user input to the AP 1200.

The wireless transceiver 1700 may include a transceiver 1720, a modem 1710, and an antenna 1730.

In some embodiments, each of the components represented by a block as illustrated in FIGS. 1, 4, 5, 15 and 16 may be implemented as various numbers of hardware and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While the inventive concept has been particularly shown and described with reference to example embodiments thereof, it will be understood that various changes in form and details may be made therein without departing from the spirit and scope of the following claims.

What is claimed is:

1. An image sensor comprising:
a pixel array comprising a plurality of pixel groups each comprising a plurality of pixels, the plurality of pixel groups comprising a first pixel group;
a readout circuit configured to output full pixel values respectively corresponding to the plurality of pixel groups and sub pixel values respectively corresponding to the plurality of pixel groups, wherein a full pixel value is generated based on pixel signals of all pixels in the first pixel group, and a sub pixel value is generated based on some of the pixel signals in the first pixel group; and
an image signal processor configured to:
perform an image processing operation based on the full pixel values;
generate, based on the full pixel value indicating the first pixel group is a saturation pixel group, a color ratio of the saturation pixel group by using a target sub pixel value corresponding to the saturation pixel group; and
compensate for the full pixel value of the saturation pixel group based on the color ratio of the saturation pixel group.

2. The image sensor of claim 1, wherein the image signal processor is further configured to generate sub color data of each of a plurality of colors of the saturation pixel group based on the target sub pixel value of a representative color by controlling a full color estimation operation, and generate the color ratio based on the sub color data of each of the plurality of colors.

3. The image sensor of claim 2, wherein the sub color data of each of the plurality of colors comprises the sub color data of each of the representative color, a first color, and a second color, and
wherein the representative color, the first color, and the second color are different colors.

4. The image sensor of claim 3, wherein the color ratio comprises a plurality of color ratios,
wherein the full color estimation operation comprises a demosaicing treatment operation, and
wherein the image signal processor is further configured to:
generate the sub color data of the representative color, the sub color data of the first color, and the sub color data of the second color by performing the demosaicing treatment operation based on the target sub pixel value, and
generate the plurality of color ratios based on the representative color, the first color, and the second color.

5. The image sensor of claim 1, wherein the image signal processor is further configured to:

convert the full pixel value of the saturation pixel group into color data of each of a plurality of colors by using a full color estimation operation; and
determine whether the color data of any of the plurality of colors is saturated.

6. The image sensor of claim 5, wherein one of the plurality of colors is an unsaturated color, and
wherein the image signal processor is further configured to compensate for the full pixel value of the saturation pixel group based on the color data of the unsaturated color and the color ratio of the unsaturated color.

7. The image sensor of claim 1, wherein the image signal processor is further configured to:
convert a full pixel value of a representative color of the saturation pixel group into color data of each of the representative color, a first color, and a second color by performing a full color estimation operation; and
determine whether the color data of each of the first color and the second color is saturated.

8. The image sensor of claim 7, wherein the image signal processor is further configured to, based on the color data of each of the first color and the second color not being saturated, compensate for the full pixel value of the saturation pixel group, based on the color data of the first color, the color data of the second color, the color ratio of the first color, and the color ratio of the second color.

9. The image sensor of claim 7, wherein one of the first color and the second color is an unsaturated color, and
wherein the image signal processor is further configured to, based on one of the color data of each of the first color and the second color being saturated, compensate for the full pixel value of the saturation pixel group, based on the color data of the unsaturated color and the color ratio of the unsaturated color.

10. The image sensor of claim 7, wherein the image signal processor is further configured to, based on the color data of each of the first color and the second color being saturated, compensate for the full pixel value of the saturation pixel group by using the target sub pixel value instead of the color ratio of the saturation pixel group.

11. The image sensor of claim 10, wherein the image signal processor is further configured to generate a pixel value obtained by increasing luminance of the target sub pixel value to the full pixel value of the saturation pixel group.

12. The image sensor of claim 1, wherein the image signal processor is further configured to detect the first pixel group as the saturation pixel group based on the full pixel value being equal to or greater than a threshold value.

13. The image sensor of claim 1, wherein the image signal processor is further configured to:
generate a color ratio of each of periphery pixel groups adjacent the first pixel group by using the sub pixel values of each of the periphery pixel groups; and
compensate for the full pixel value of each of the periphery pixel groups by using the color ratio of each of the periphery pixel groups.

14. An image sensor comprising:
a pixel array comprising a plurality of pixel groups each comprising a plurality of pixels, the plurality of pixel groups comprising a first pixel group;
a readout circuit configured to generate image data based on pixel signals output by the pixel array; and
an image signal processor,
wherein the image data comprises full image data obtained by summing the pixel signals generated by all pixels of each of the plurality of pixel groups in units of pixel groups and sub image data obtained by summing the pixel signals generated by some of the pixels by each of the plurality of pixel groups in units of the pixel groups, and wherein the image signal processor is configured to:

perform an image processing operation based on the image data;

generate a color ratio of each of the plurality of pixel groups by using the sub image data;

detect the first pixel group as a saturation pixel group based on the full image data; and compensate for the full image data corresponding to the saturation pixel group based on the color ratio corresponding to the saturation pixel group.

15. The image sensor of claim 14, wherein the color ratio comprises a plurality of color ratios, and wherein the image signal processor is further configured to:

perform a demosaicing operation based on the sub image data to convert the demosaiced sub image data into sub color data of a representative color, sub color data of a first color, and sub color data of a second color; and by using the sub color data of the representative color, the sub color data of the first color, and the sub color data of the second color, generate the plurality of color ratios based on the representative color, the first color, and the second color of each of the plurality of pixel groups.

16. The image sensor of claim 14, wherein the image signal processor is further configured to, based on the saturation pixel group being detected, convert the full image data corresponding to the saturation pixel group into color data of each of the plurality of colors, and determine whether the color data of each of a plurality of colors is saturated.

17. The image sensor of claim 16, wherein the image signal processor is further configured to compensate for the full image data corresponding to the saturation pixel group based on the color data of an unsaturated color and the color ratio of the unsaturated color.

18. The image sensor of claim 16, wherein the image signal processor is further configured to, based on the color data of each of the plurality of colors being saturated, compensate for the full image data corresponding to the saturation pixel group based on the sub image data corresponding to the saturation pixel group instead of the color ratio.

19. The image sensor of claim 14, wherein each of the plurality of pixel groups comprises n×n (n is a positive integer) pixels, and wherein identical color filters are arranged on the n×n pixels comprised in each of the plurality of pixel groups.

20. An image processing device comprising:

an interface configured to receive, from an image sensor, full pixel values, the full pixel values being generated based on pixel signals of all pixels in each of a plurality of pixel groups of the image sensor, wherein each of the plurality of pixel groups respectively comprises a plurality of pixels; and a processor configured to:

detect a saturation pixel group among the plurality of pixel groups based on the full pixel values;

generate a color ratio of the saturation pixel group based on a target sub pixel value generated based on the pixel signals of some pixels in the saturation pixel group;

detect an unsaturated color component among a plurality of color components corresponding to the full pixel value of the saturation pixel group; and compensate for the full pixel value of the saturation pixel group by using the color ratio of the unsaturated color component.

* * * * *